United States Patent
Gritter et al.

(10) Patent No.: US 10,652,329 B1
(45) Date of Patent: May 12, 2020

(54) CLUSTER VIRTUAL MACHINES

(71) Applicant: Tintri by DDN, Inc., Santa Clara, CA (US)

(72) Inventors: Mark G. Gritter, Eagan, MN (US); Umesh Patil, Cupertino, CA (US)

(73) Assignee: Tintri by DDN, Inc., Santa Clara, CA (US)

( * ) Notice: Subject to any disclaimer, the term of this patent is extended or adjusted under 35 U.S.C. 154(b) by 289 days.

(21) Appl. No.: 14/709,341

(22) Filed: May 11, 2015

Related U.S. Application Data

(60) Provisional application No. 61/991,995, filed on May 12, 2014.

(51) Int. Cl.
*G06F 15/16* (2006.01)
*H04L 29/08* (2006.01)
*G06F 9/455* (2018.01)

(52) U.S. Cl.
CPC ...... *H04L 67/1097* (2013.01); *G06F 9/45558* (2013.01); *H04L 67/1095* (2013.01); *G06F 2009/45595* (2013.01)

(58) Field of Classification Search
CPC . G06F 2009/45562; G06F 2009/45591; G06F 9/45558; G06F 9/5077; G06F 9/45533; G06F 21/53; G06F 2201/815; G06F 2009/4557
See application file for complete search history.

(56) References Cited

U.S. PATENT DOCUMENTS

| | | | |
|---|---|---|---|
| 8,214,483 B2 | 7/2012 | Van Riel et al. | |
| 8,239,526 B2 * | 8/2012 | Simpson | G06F 11/3409 709/224 |
| 8,326,803 B1 | 12/2012 | Stringham | |
| 8,799,709 B2 * | 8/2014 | Iikura | G06F 11/1415 714/19 |
| 9,223,962 B1 | 12/2015 | Kashyap et al. | |
| 2008/0208931 A1 * | 8/2008 | Van Riel | G06Q 30/02 707/999.204 |
| 2010/0088699 A1 | 4/2010 | Sasaki | |
| 2012/0047502 A1 * | 2/2012 | Hashimoto | G06F 9/5077 718/1 |
| 2012/0290718 A1 * | 11/2012 | Nethercutt | G06F 11/3006 709/224 |
| 2012/0303739 A1 * | 11/2012 | Ferris | H04L 67/06 709/217 |
| 2014/0052692 A1 | 2/2014 | Zhang et al. | |
| 2014/0059538 A1 * | 2/2014 | Bookman | G06F 9/4445 718/1 |
| 2015/0199253 A1 * | 7/2015 | Sprague | G06F 11/3485 709/224 |

* cited by examiner

*Primary Examiner* — Suraj M Joshi
*Assistant Examiner* — Ayele F Woldemariam
(74) *Attorney, Agent, or Firm* — Van Pelt, Yi & James LLP

(57) ABSTRACT

Aggregating data associated with cluster virtual machines is disclosed, including obtaining from a plurality of storage systems a plurality of values associated with an attribute associated with a cluster virtual machine (VM); and aggregating the plurality of values associated with the attribute based at least in part on an aggregation semantic associated with the attribute.

18 Claims, 13 Drawing Sheets

Cluster VM ID: 123

Dynamic attribute: IOPS

800 ⬈

| | 12:00 | 12:10 | 12:20 | 12:30 |
|---|---|---|---|---|
| Storage System A | 100 | 101 | -- | -- |
| Storage System B | 200 | 250 | -- | -- |
| Storage System C | 5 | 5 | -- | -- |
| Cluster Value | 305 | 356 | -- | -- |

FIG. 8A

Cluster VM ID: 123
Dynamic attribute: IOPS

| | 12:00 | 12:10 | 12:20 | 12:30 |
|---|---|---|---|---|
| Storage System A | 100 | 101 | 80 | 1000 |
| Storage System B | 200 | 250 | 300 | 310 |
| Storage System C | 5 | 5 | 5 | 5 |
| Cluster Value | 305 | 356 | 385 | 1315 |

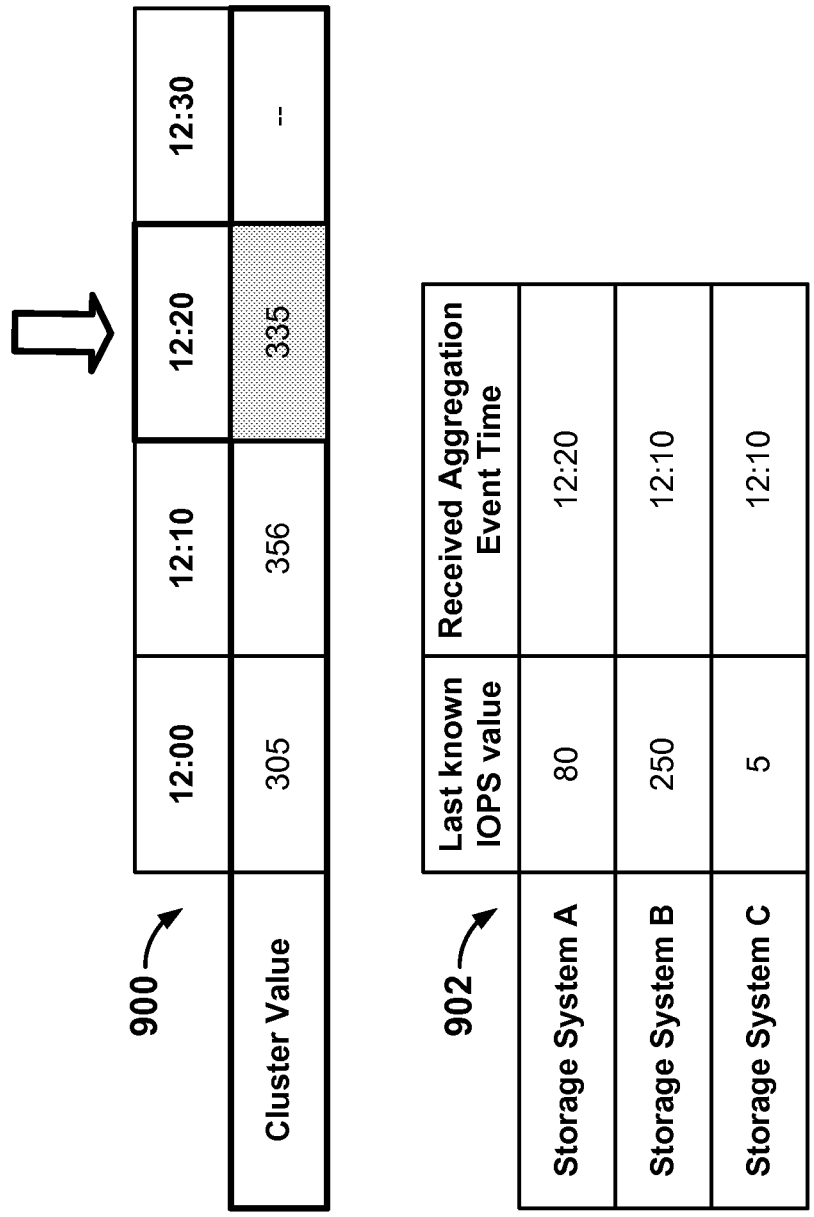

CLUSTER VIRTUAL MACHINES

CROSS REFERENCE TO OTHER APPLICATIONS

This application claims priority to U.S. Provisional Patent Application No. 61/991,995 entitled SYNTHETIC VIRTUAL MACHINES filed May 12, 2014 which is incorporated herein by reference for all purposes.

BACKGROUND OF THE INVENTION

Conventionally, each storage system is separately checked for the virtual machine data that is stored at that storage system. In some instances, a virtual machine may have state stored on multiple storage systems. Traditionally, there is not a convenient technique by which to view the state of the virtual machine that is stored across multiple storage systems.

BRIEF DESCRIPTION OF THE DRAWINGS

Various embodiments of the invention are disclosed in the following detailed description and the accompanying drawings.

FIGS. 8A, 8B, and 8C describe a first example of storing cluster values associated with a cluster VM.

FIGS. 9A, 9B, and 9C describe a second example of storing cluster values associated with a cluster VM.

DETAILED DESCRIPTION

Figure 1:
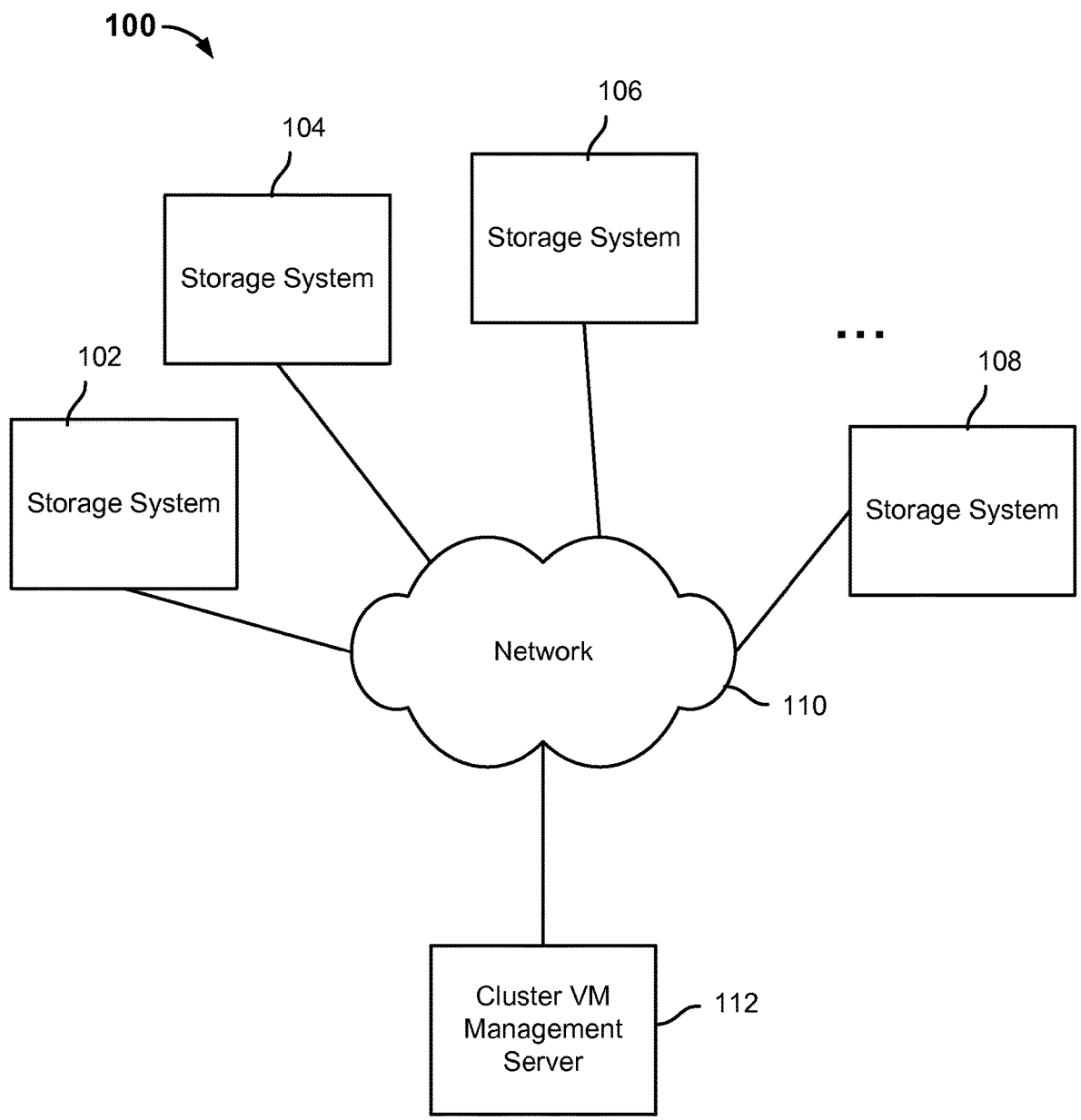
FIG. 1 is a diagram showing an embodiment of a system for aggregating data associated with a cluster VM.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of aggregating data associated with a cluster virtual machine are described herein. In various embodiments, a "cluster virtual machine" (which is sometimes referred to as a "cluster VM") comprises an object that represents the aggregated state of a virtual machine (which is sometimes referred to as a "VM") that is stored across one or more storage systems. In some embodiments, the one or more storage systems across which a VM's state is stored are in a cluster of storage systems. In various embodiments, the aggregated state of a VM comprises static and/or dynamic attributes associated with the VM that have been aggregated from the one or more storage systems. Examples of static attributes include a user given name of a VM, whether the VM has been powered on or off, file identifiers (which are sometimes referred to as "IDs"), and an identifier of a hypervisor with which the VM is associated. Examples of dynamic attributes include attributes related to performance including Input/Output Operations Per Second (IOPS), latency, throughput, and storage space utilized.

In various embodiments, values of attributes associated with a cluster VM are periodically obtained from one or more storage systems. The obtained values of a particular attribute associated with the cluster VM are then aggregated to determine a cluster value associated with the attribute of the cluster VM in a way that is semantically appropriate to that particular attribute. A different aggregation semantic may be configured for an attribute based on whether it is a static attribute or a dynamic attribute. Furthermore, a different aggregation semantic may be configured for each particular static attribute or each particular dynamic attribute. In various embodiments, each instance of obtaining and aggregating data associated with a cluster VM from one or more storage systems is referred to as an "aggregation event." In some embodiments, aggregation events occur periodically and a cluster value may be stored corresponding to each attribute associated with the cluster VM associated with each aggregation event. For example, an aggregation event may occur at every predetermined interval (e.g., 10 minutes).

In various embodiments, data associated with a cluster VM that is tracked by and/or is available from a hypervisor is referred to as "live data." As such, cluster VM data that is tracked by and/or is available from a hypervisor is referred to as a "live VM." In some instances, a cluster VM may have files and/or other data objects in addition to those that are tracked by a hypervisor. In various embodiments, cluster VM data that is not tracked and/or is available from a hypervisor but is retained by data sources other than a hypervisor is referred to as "synthetic data." Generally, synthetic data associated with a cluster VM may be historical, distributed, or even misconfigured. Specific examples of types of synthetic data include VM replica information that is not known to a hypervisor, cached data associated with a VM that has been removed/deleted from a hypervisor's inventory, and a snapshot associated with a VM that has been removed/deleted from a hypervisor's inventory. In various embodiments, the synthetic data associated with a cluster VM represents a synthesized state of the cluster VM that is retained by one or more storage systems. Data associated with this synthesized state is not available from a hypervisor like data associated with the cluster VM's live state. In some embodiments, the values of attributes associated with a cluster VM are aggregated from both live and/or synthetic data associated with the cluster VM. In some embodiments, at least some of the storage systems from which attribute values are aggregated store live data, synthetic data, or both, associated with the cluster VM. In some embodiments, the data associated with a cluster VM is presented at a user interface to enable a viewing user to have a cluster-wide view of the cluster VM.

FIG. 1 is a diagram showing an embodiment of a system for aggregating data associated with a cluster VM. In the example, system 100 includes storage systems 102, 104, 106, and 108, network 110, and cluster VM management server 112. Network 110 includes high-speed data networks and/or telecommunications networks.

Figure 2:
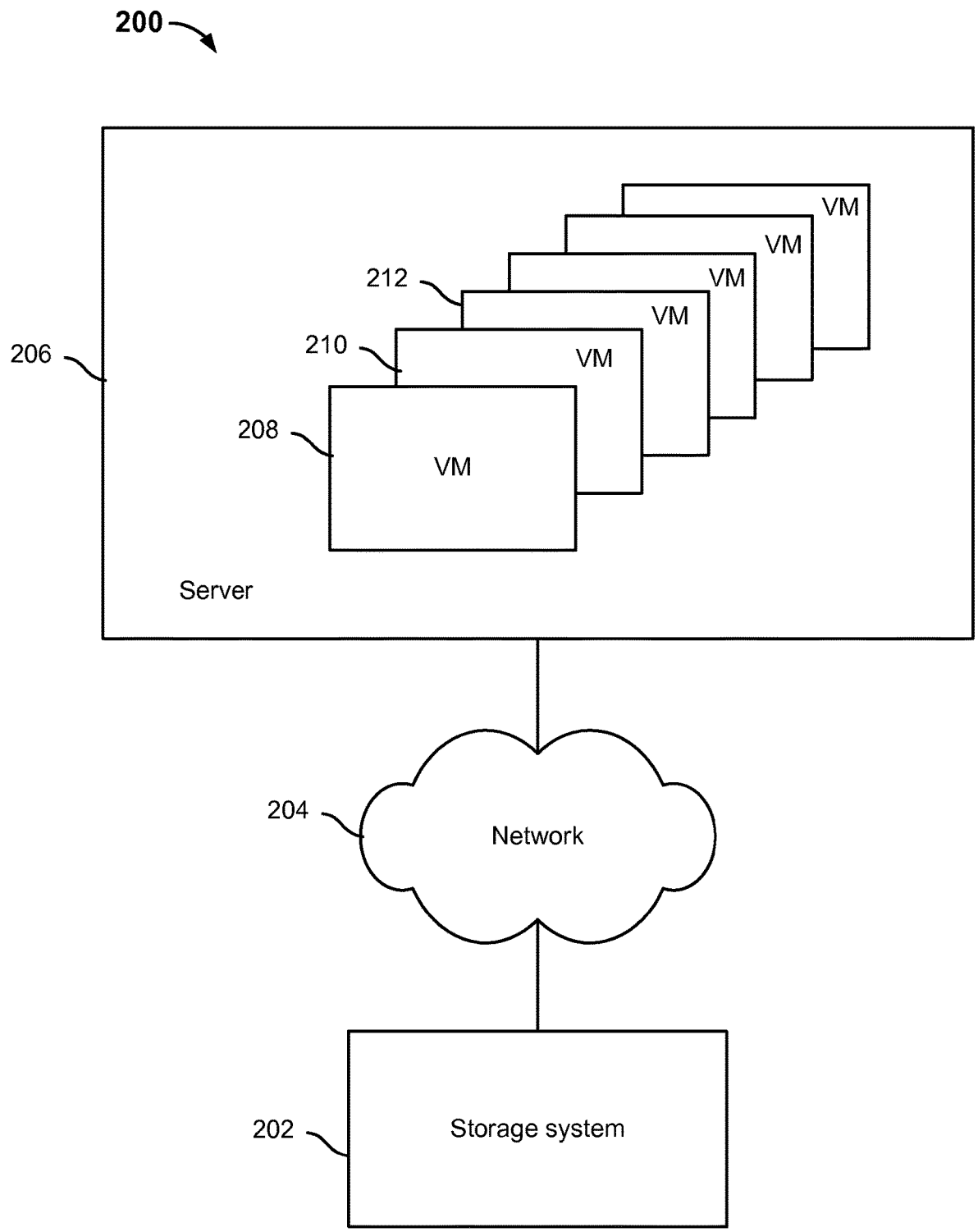
FIG. 2 is a diagram showing an embodiment of a storage system for the storage of virtual machines using virtual machine storage abstractions.
Figure 3:
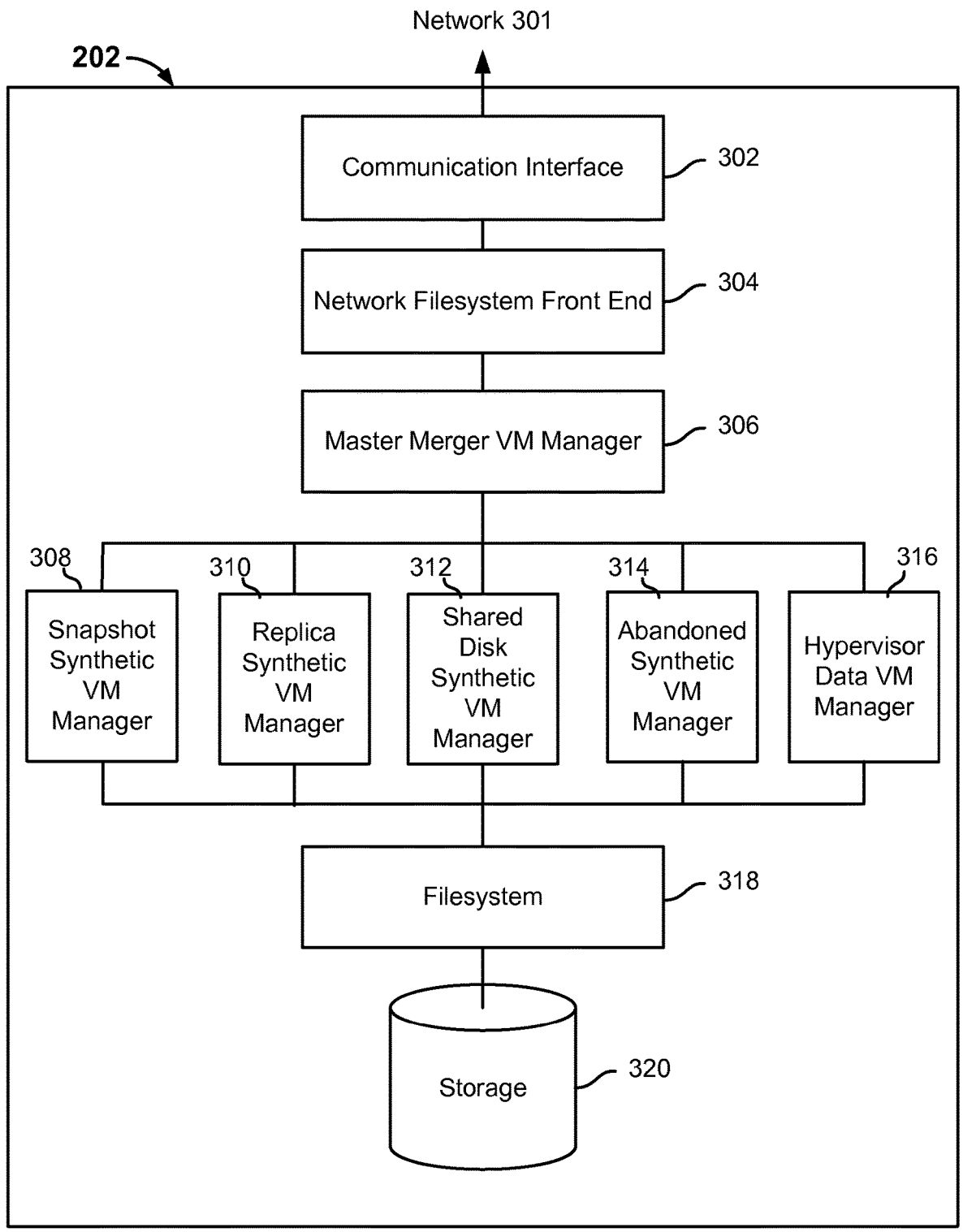
FIG. 3 is a block diagram illustrating an embodiment of a storage system including data and metadata.

Each of the storage systems such as storage systems 102, 104, 106, and 108 is configured to store live and/or synthetic data associated with various VMs that are managed by one or more hypervisors (not shown in the diagram). In some embodiments, stored data associated with a VM is associated with a unique VM identifier (ID). In some embodiments, the unique VM ID comprises a universal unique identifier (UUID). In some embodiments, a VM's UUID is assigned by cluster VM management server 112 or by a hypervisor associated with managing that VM. In some embodiments, a storage system such as storage systems 102, 104, 106, and 108 is configured to aggregate data associated with each VM from various live and/or synthetic data sources. FIGS. 2 and 3 below describe an example storage system such as storage systems 102, 104, 106, and 108.

In various embodiments, cluster VM management server 112 is configured to communicate to each of multiple storage systems, such as, for example, storage systems 102, 104, 106, and 108, over network 110. In various embodiments, cluster VM management server 112 is a management appliance that performs various storage management tasks such as monitoring, reporting, and control operations for one or multiple storage systems. For example, cluster VM management server 112 can be implemented by Tintri Global Center™. In some embodiments, cluster VM management server 112 is configured to provide a convenient single point of management for up to multiple storage systems as well as additional management features that are not available directly from a single storage system.

Cluster VM management server 112 is configured to obtain and aggregate data associated with various VMs, each of which's data is stored at one or more of the storage systems. Put another way, cluster VM management server 112 is configured to collect the single storage system view of a VM from each storage system that stores data associated with that VM and combine the collected data into a single cluster-wide object referred to as a cluster VM. In some embodiments, cluster VM management server 112 identifies data collected from multiple storage systems as being associated with the same VM based on the VM ID associated with the data. As such, a cluster VM comprises data aggregated from one or more storage systems that is associated with the same VM ID. Cluster VM management server 112 is configured to aggregate values associated with an attribute associated with a cluster VM that are collected from one or more storage systems into a cluster value based on an aggregation semantic that is associated with that particular attribute. In various embodiments, the aggregation semantic associated with each particular attribute is predetermined and stored.

In some embodiments, cluster VM management server 112 is configured to collect live data, synthetic data, or both live and synthetic data, associated with each cluster VM for which a storage system stores data. Cluster VM managements server 112 is configured to present the aggregated data associated with various cluster VMs to allow users to better understand the overall (live and/or synthetic) state of each cluster VM across multiple storage systems.

The following are example uses in which a VM's data may be stored across multiple storage systems:

A VM has virtual disks on two or more separate storage systems.

A VM has performance history from both the old and new storage systems after a storage migration has been performed.

A VM is replicated from the storage system where it is "live" to one or more destination storage systems, so it occupies space (and performance reserves) at multiple storage systems.

A snapshot of a VM is replicated multiple times across multiple storage systems.

In various embodiments, cluster VM management server 112 is configured to periodically obtain and aggregate data associated with various VMs from storage systems such as storage systems 102, 104, 106, and 108. In various embodiments, each instance of obtaining and aggregating data associated with various VMs from storage systems such as storage systems 102, 104, 106, and 108 is referred to as an aggregation event. In some embodiments, an aggregation event is performed by cluster VM management server 112 at every predetermined interval. For example, an aggregation event can be performed by cluster VM management server 112 at the predetermined interval of every 10 minutes and therefore, each aggregation event is identified by a time at which the aggregation was performed. In some embodiments, an aggregation event is performed by cluster VM management server 112 in response to a detected predetermined event. For example, an aggregation event can be performed by cluster VM management server 112 in response to the predetermined event of a user submitted request to aggregate data for cluster VMs. In some embodiments, a cluster value aggregated from the attribute values associated with an attribute of a cluster VM is stored with each aggregation event so cluster VM management server 112 may provide the cluster values associated with that attribute of the cluster VM across multiple aggregation events.

During an aggregation event, if cluster VM management server 112 cannot connect to a storage system from which it was to obtain the value of an attribute of a cluster VM, then the unreachable storage system is referred to as an "unresponsive storage system." In some embodiments, cluster VM management server 112 is configured to determine an extrapolated value associated with the unresponsive storage system for the attribute of the cluster VM and proceed to aggregate the extrapolated value with the attribute values for the attribute of the cluster VM that were collected from the responsive storage systems. In some embodiments, the extrapolated value is determined from a historical attribute value for the attribute of the cluster VM that was previously received from the currently unresponsive storage system. As such, cluster VM management server 112 will store a cluster value associated with the attribute of the cluster VM associated with an aggregation event even if at least one storage system from which an attribute value was to be obtained was unresponsive. The extrapolated value is used in the place of an attribute value that could not be received from an unresponsive storage system because it is undesirable for the behavior of a cluster VM to appear erratic even if information from different components is absent or delayed. For example, if cluster VM management server 112 cannot connect to a storage system, then showing the space utilization of "0" from that unresponsive storage system would almost certainly be incorrect and misleading. In some embodiments, if the unresponsive storage system later becomes responsive (i.e., can be connected to cluster VM management server 112) and the previously absent attribute value(s) are obtained by cluster VM management server 112, then cluster VM management server 112 is configured to update the cluster values associated with the attribute associated with the cluster VMs for the affected aggregation events with the previously absent attribute values(s).

While cluster VM management server 112 is shown to be a remote, central management server relative to the storage systems (storage systems 102, 104, 106, and 108) from which it aggregates cluster VM data, in some other embodiments, cluster VM management server 112 can be configured to be a part of one of the storage systems from which it aggregates cluster VM data.

FIG. 2 is a diagram showing an embodiment of a storage system for the storage of virtual machines using virtual machine storage abstractions. In the example shown, system 200 includes server 206, network 204, and storage system 202. In some embodiments, any of storage systems 102, 104, 106, and 108 of system 100 of FIG. 1 is implemented using storage system 202. In various embodiments, network 204 includes various high-speed data networks and/or telecommunications networks. In some embodiments, storage system 202 communicates with server 206 via network 204. In some embodiments, the filesystem for the storage of virtual machines (VMs) using virtual machine storage abstractions does not include network 204, and storage system 202 is a component of server 206. In some embodiments, server 206 is configured to communicate with other storage systems in addition to storage system 202.

In various embodiments, server 206 runs several VMs. In the example shown, VMs 208, 210, and 212 (and other VMs) are running on server 206. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes one or more virtual disks (which are also sometimes referred to "vdisks") and other data related to the specific VM (e.g., configuration files and utility files for implementing functionality, such as snapshots, that are supported by the VM management infrastructure). A vdisk appears to be an ordinary physical disk drive to the guest operating system running on a VM. In various embodiments, one or more files may be used to store the contents of vdisks. In some embodiments, a VM management infrastructure (e.g., a hypervisor) creates the files that store the contents of the vdisks (e.g., the guest operating system, program files and data files) and the other data associated with the specific VM. For example, the hypervisor may create a set of files in a directory for each specific VM. Examples of files created by the hypervisor store the content of one or more vdisks, the state of the VM's BIOS, information and metadata about snapshots created by the hypervisor, configuration information of the specific VM, etc. In various embodiments, data associated with a particular VM is stored on a storage system as one or more files. In various embodiments, the files are examples of virtual machine storage abstractions. In some embodiments, the respective files associated with (at least) VMs 208, 210, and 212 running on server 206 are stored on storage system 202.

In various embodiments, storage system 202 is configured to store metadata identifying which stored data objects, such as files or other virtual machine storage abstractions, are associated with which VM or vdisk. In various embodiments, storage system 202 stores the data of VMs running on server 206 and also stores the metadata that provides mapping or other identification of which data objects are associated with which specific VMs. In various embodiments, mapping or identification of specific VMs includes mapping to the files on the storage that are associated with each specific VM. In various embodiments, storage system 202 also stores at least a portion of the files associated with the specific VMs in addition to the mappings to those files. In various embodiments, storage system 202 refers to one or more physical systems and/or associated hardware and/or software components configured to work together to store and manage stored data, such as files or other stored data objects. In some embodiments, a hardware component that is used to (at least in part) implement the storage system may be comprised of either hard disk or solid state disk, or a combination of hard disk and solid state disk.

In some embodiments, one or more hypervisors (not shown) manage the VMs running on server 206. In some embodiments, the one or more hypervisors are located at server 206. In some embodiments, the one or more hypervisors are located on another server that is in communication with server 206. In some embodiments, storage system 202 includes communication with the one or more hypervisors that manage the VMs running on server 206.

As will be described in further detail below, storage system 202 is configured to collect VM data associated with one or more VMs from various data sources of VM data. In some embodiments, at least one data source of VM data of the various data sources of VM data is a hypervisor that manages at least a VM running on server 206. As mentioned above, the VM data associated with a VM that is collected from a hypervisor is referred to as "live data." In various embodiments, at least one data source of VM data of the various data sources of VM data is not a hypervisor. For example, a data source that is not a hypervisor is the filesystem at storage system 202, which may store at least some VM data that is not available from a hypervisor that manages the VMs. As mentioned above, the VM data associated with a VM that is collected from a non-hypervisor data source is referred to as "synthetic data." In various embodiments, storage system 202 is configured to merge together the live and/or synthetic VM data collected from the various data sources of VM data for each VM as a set of related data associated with that VM. For example, the set of related data associated with a VM comprises a set of metadata associated with the VM. In some embodiments, the set of related data associated with a VM comprises static attributes (e.g., identifiers of data objects) and dynamic attributes (e.g., performance and capacity statistics). For example, the static attributes of the set of related data associated with the VM include an identifier of the VM, an identifier of a vdisk of the VM, the association of the VM to a particular hypervisor identifier/name (if any) or multi-VM application, and identifiers of (local) file identifiers (IDs) that are associated with the VM. For example, the dynamic attributes of the set of related data associated with the VM include performance and capacity statistics of the live data associated with the VM, performance and capacity statistics for a snapshot associated with the VM, performance and capacity statistics for an ongoing replication of the VM, and whether the VM or a file thereof is still present. Storage system 202 can present the set of related data associated with a VM at a user interface to enable a user to view the overall state of the VM.

For example, when a VM has array-level snapshots but its live version has been deleted from the managing hypervisor, the storage space occupied by those snapshots can be shown as synthetic data associated with that VM as a user interface. In some embodiments, an "array-level snapshot" is a snapshot that is created by the storage system (e.g., storage system 202). In some embodiments, snapshots may also be created outside the storage system, for example, by a hypervisor. In some embodiments, even if all the stored data (including snapshots) associated with a VM is deleted from the storage system, the VM is continued to be shown as a "historical" object with a performance history at the user interface, for reporting purposes.

For example, when a VM is replicated from one storage system to another, the space and incoming replication statistics of the VM on the destination storage system can be tracked.

In various embodiments, the presence of per-VM snapshots and replication enables associating the associated state (e.g., space consumption, replication throughput, and performance data) to an individual VM rather than to a volume as a whole. It may not be desirable to have a "synthetic volume" if volumes are rarely moved or deleted.

For example, when a VM has been removed from a managing hypervisor's inventory, but its files are still live on the disk of the storage system (e.g., storage system 202), the presence of those files tracked as synthetic data associated with that VM. Similarly, in some embodiments, if a VM has been deleted on disk but still remains in hypervisor inventory, the VM can be tracked as a different type of synthetic VM.

For example, in some hypervisor environments such as OpenStack, there may be storage objects (e.g., volumes) that are not currently bound to a VM. In some embodiments, these can be tracked as synthetic data associated with a VM for space accounting. Also, in some embodiments, in a model where individual real VMs are not the primary objects of interest, a set of related data associated with a VM can be created to track the overall state and resource consumption of an entire application. The true state of an application is stored in persistent volumes and thus it is more important to track the aggregate statistics for the set of volumes than the particular VM instances those volumes are bound to at the moment.

The set of related data associated with a VM works across multiple hypervisors as naturally as one hypervisor. In various embodiments, the set of related data associated with a VM provides a linearizable history of the VM. A VM may exist on different storage systems at different points in its life, or may even switch from one hypervisor to another. But if it is the same VM from the user's point of view, the synthesized performance history behaves as if the VM was a single continuous entity.

FIG. 3 is a block diagram illustrating an embodiment of a storage system including data and metadata. In various embodiments, any of storage systems 102, 104, 106, and 108 of FIG. 1 can be implemented using the example storage system of FIG. 2. In various embodiments, storage system 202 of FIG. 2 can be implemented using the example storage system of FIG. 2. In the example shown, storage system 202 includes a network connection 301 and a communication interface 302, such as a network interface card or other interface, which enable the storage system to be connected to and communicate via a network such as network 110 of FIG. 1. Storage system 202 further includes network filesystem front end 304, connected to filesystem 318, configured to handle NFS requests from virtual machines running on systems such as server 206 of FIG. 2. In various embodiments, network filesystem front end 304 is configured to associate NFS requests as received and processed with a corresponding VM and/or virtual disk (vdisk) with which the request is associated, for example, using metadata stored at persistent storage 320 or elsewhere.

Storage system 202 further includes master merger VM manager 306, snapshot synthetic VM manager 308, replica synthetic VM manager 310, shared disk synthetic VM manager 312, abandoned synthetic VM manager 314, and hypervisor data VM manager 316. Each of master merger VM manager 306, snapshot synthetic VM manager 308, replica synthetic VM manager 310, shared disk synthetic VM manager 312, abandoned synthetic VM manager 314, and hypervisor data VM manager 316 can be implemented using software, hardware, or a combination of software and hardware.

Hypervisor data VM manager 316 is configured to collect live data associated with one or more VMs from a hypervisor (not shown). In some embodiments, hypervisor data VM manager 316 is configured to collect live data from a hypervisor periodically and/or in response to a detected event (e.g., an update made by the hypervisor to a VM). Examples of types of hypervisors include VMware, Red Hat Enterprise Virtualization, and Hyper-V. For example, hypervisor data VM manager 316 is configured to collect data associated with one or more VMs from a single type of hypervisor or multiple types of hypervisors. In some embodiments, hypervisor data VM manager 316 is configured to call the API associated with a hypervisor, receive configuration files from the hypervisor, and parse the configuration files to determine the live data associated with each VM. Examples of live data associated with each VM include static attributes (e.g., identifiers used to describe the VM or a vdisk thereof, identifiers of data objects included in the live data associated with the VM, the association between the VM and the identifier of the hypervisor) and dynamic attributes (e.g., performance and capacity statistics of data objects included in the live data associated with the VM). In some embodiments, storage system 202 includes one or more instances of a hypervisor data VM manager collecting data from a corresponding type of one or more hypervisor types. In some embodiments, collected live data associated with each particular VM is associated with that VM's universal unique identifier (UUID). In some embodiments, a VM's UUID is assigned by a storage system such as storage system 202 or by a hypervisor.

Each of snapshot synthetic VM manager 308, replica synthetic VM manager 310, shared disk synthetic VM manager 312, and abandoned synthetic VM manager 314 is configured to collect a type of synthetic data associated with one or more VMs from a corresponding data source that is not a hypervisor. A description of each synthetic VM manager is as follows:

Snapshot synthetic VM manager 308 is configured to query filesystem 318 for snapshot data associated with one or more VMs stored at storage 320. In some embodiments, a snapshot associated with a VM may be generated by a hypervisor or by storage system 202. In various embodiments, a snapshot associated with a VM includes (e.g., refers to locations in storage) of the files associated with the VM at the time that the snapshot was generated. In various embodiments, snapshot data associated with a VM includes static attributes (e.g., identifiers used to describe the VM or a vdisk thereof, identifiers of data objects included in a snapshot of the VM) and dynamic attributes (e.g., performance and capacity statistics for a snapshot of the VM). In some embodiments, collected snapshot data associated with each particular VM is associated with that VM's UUID.

Replica synthetic VM manager 310 is configured to query filesystem 318 for incoming replica data associated with one or more VMs that are being replicated to storage system 202 (i.e., storage system 202 is the destination of the replication of these VMs). In some embodiments, if a VM is still live (e.g., data associated with the VM is available from a hypervisor), then incoming replication of the VM is not permitted at storage system 202. In some embodiments, the replica data associated with a VM that is being replicated to storage system 202 is associated with an ongoing replication. The replication produces a copy of the data in the live VM, stored as snapshots. This is usually an ongoing process (as more snapshots are taken, more replication will be done) but it could be a one-time event as well. Until the first snapshot has completely arrived, the state on the destination storage system comprises (1) (hidden) files to which replicated data is being written and (2) metadata within the file system itself related to the incoming network connection, status and performance of the replication protocol, and the identity of the incoming VM. After the first snapshot has completed, all those pieces of state are still present, but the information in the snapshot metadata is also available to work with. In some embodiments, replica synthetic VM manager 310 is configured to query filesystem 318 periodically or in response to an event (e.g., the start of replication of a VM to storage system 202). The replica data associated with the ongoing replication of a VM may not include a snapshot associated with the VM (e.g., because a snapshot has not been generated for the VM and/or has not yet been replicated at storage system 202). In some embodiments, outgoing replica data associated with a VM that is to be replicated at a storage system other than storage system 202 does not need to be collected. In some embodiments, the replica data associated with a VM includes stored information in an incoming replication configuration. Examples of stored information in an incoming replication configuration include a user given name of a VM, a VM UUID, a hypervisor given VM identifier, and/or a time at which the snapshot was taken. In various embodiments, replica data associated with a VM includes static attributes (e.g., identifiers used to describe the VM or a vdisk thereof, identifiers of data objects included in the replica data of the VM) and dynamic attributes (e.g., performance and capacity statistics for the replica data of the VM). In some embodiments, collected replica data associated with each particular VM is associated with that VM's UUID.

Shared disk synthetic VM manager 312 is configured to post process the information collected by hypervisor data VM manager 316 by identifying files which belong to multiple VMs and presenting each of those files as a different synthetic VM. This situation can arise when, for example, many virtual desktops are created from the same "base disk" (or disks) holding the shared operation system and applications.

The following describes an example in which a file, file1, that belongs to multiple VMs can be identified and for which a synthetic VM can be created:

VM1→disk A→file1, file2
VM2→disk B→file1, file3

In this example, shared disk synthetic VM manager 312 notices that file1 is referenced multiple times and creates a synthetic VM:

shared disk VM for "file 1"→synthetic disk→file 1

Identifying files that belong to multiple VMs and then creating a synthetic VM for each such file ensures that storage operations and statistics on the shared file are not performed/counted multiple times, nor omitted, nor associated with an unpredictable VM (e.g., one of VM1 or VM2 "at random").

Abandoned synthetic VM manager 314 is configured to query filesystem 318 for cached data associated with one or more VMs that are stored at storage 320. In some embodiments, abandoned synthetic VM manager 314 is configured to query filesystem 318 periodically or in response to an event (e.g., the deletion of a VM by a hypervisor). In some embodiments, cached data is associated with VMs that have been removed from a hypervisor's inventory. In various embodiments, the cached data was obtained from the hypervisor and is associated with VMs that were previously listed in the hypervisor's inventory but have since become absent. In some embodiments, the cached data is maintained at storage 320 based on a caching policy (e.g., the cached data associated with a VM that is deleted from a hypervisor is maintained for one week after the deletion). In various embodiments, cached data associated with a VM includes static attributes (e.g., identifiers used to describe the VM or a vdisk thereof, identifiers of data objects included in the cached data of the VM) and dynamic attributes (e.g., performance and capacity statistics for the cached data of the VM). In some embodiments, collected cached data associated with each particular VM is associated with that VM's UUID.

In actual implementation, other and/or different data types of synthetic data associated with VMs other than the snapshot data, replica data, shared disk data, and cached data, such as those described above, may be collected by respective synthetic VM managers at a storage system such as storage system 202.

Master merger VM manager 306 is configured to receive and merge together the live data (if any) associated with a VM collected by hypervisor data VM manager 316 and also the synthetic data associated with the VM from snapshot synthetic VM manager 308, replica synthetic VM manager 310, shared disk synthetic VM manager 312, and abandoned synthetic VM manager 314. In some embodiments, master merger VM manager 306 is configured to receive and merge together live and/or synthetic data associated with a VM from the various data sources periodically or in response to an event (e.g., a received indication to present VM state at a user interface). Master merger VM manager 306 is configured to identify the received live and/or synthetic data that is associated with each VM using that VM's UUID. Master merger VM manager 306 is configured to determine whether the aggregated live and/or synthetic data associated with each VM includes any conflicts. In some embodiments, a conflict exists when inconsistent data (e.g., different versions of the same file) is collected from two different data sources. As will be described in further detail below, in the event that a conflict exists, master merger VM manager 306 is configured to resolve the conflict by maintaining the data associated with a more preferred data type from the data associated with the conflict in the set of related data (e.g., and discarding the data associated with the less preferred data type associated with the conflict) using data type preference data (e.g., stored at storage 320). For example, the data type preference data comprises a list of data types ordered by their respective preference/priority. In various embodiments, a data type of a data describes the data source from which it was collected. For example, the data type of "live data" is collected from a hypervisor, the data type of "snapshot data" is collected from a snapshot, the data type of "replica data" is collected from an incoming replication configuration, the data type of "shared disk data" is collected from a storage, and the data type of "abandoned data" is collected from cached data. For example, the data type preference data may indicate that live data is to be selected over any type of synthetic data and that if live data is not available, then snapshot data is to be selected over any other type of synthetic data, and so forth. After resolving any conflicts, master merger VM manager 306 is configured to store the remaining aggregated live and/or synthetic data associated with a VM as a set of related data associated with that VM at storage 320. For example, the set of related data associated with a VM is stored with that VM's UUID. In some embodiments, the set of related data associated with a VM comprises underlying data and/or metadata. In some embodiments, the set of related data associated with the VM include an identifier of the VM, a identifier of a vdisk of the VM, the association of the VM to a particular hypervisor identifier/name (if any) or multi-VM application, identifiers of (local) files that are associated with the VM, performance and capacity statistics of the live data associated with the VM, performance and capacity statistics for a snapshot associated with the VM, performance and capacity statistics for an ongoing replication of the VM, and whether the VM or a file thereof is still present. Storage system 202 can present the set of related data associated with a VM at a user interface to enable a user to view the overall state of the VM with respect to data associated with the VM that is stored at storage system 202.

Figure 4:
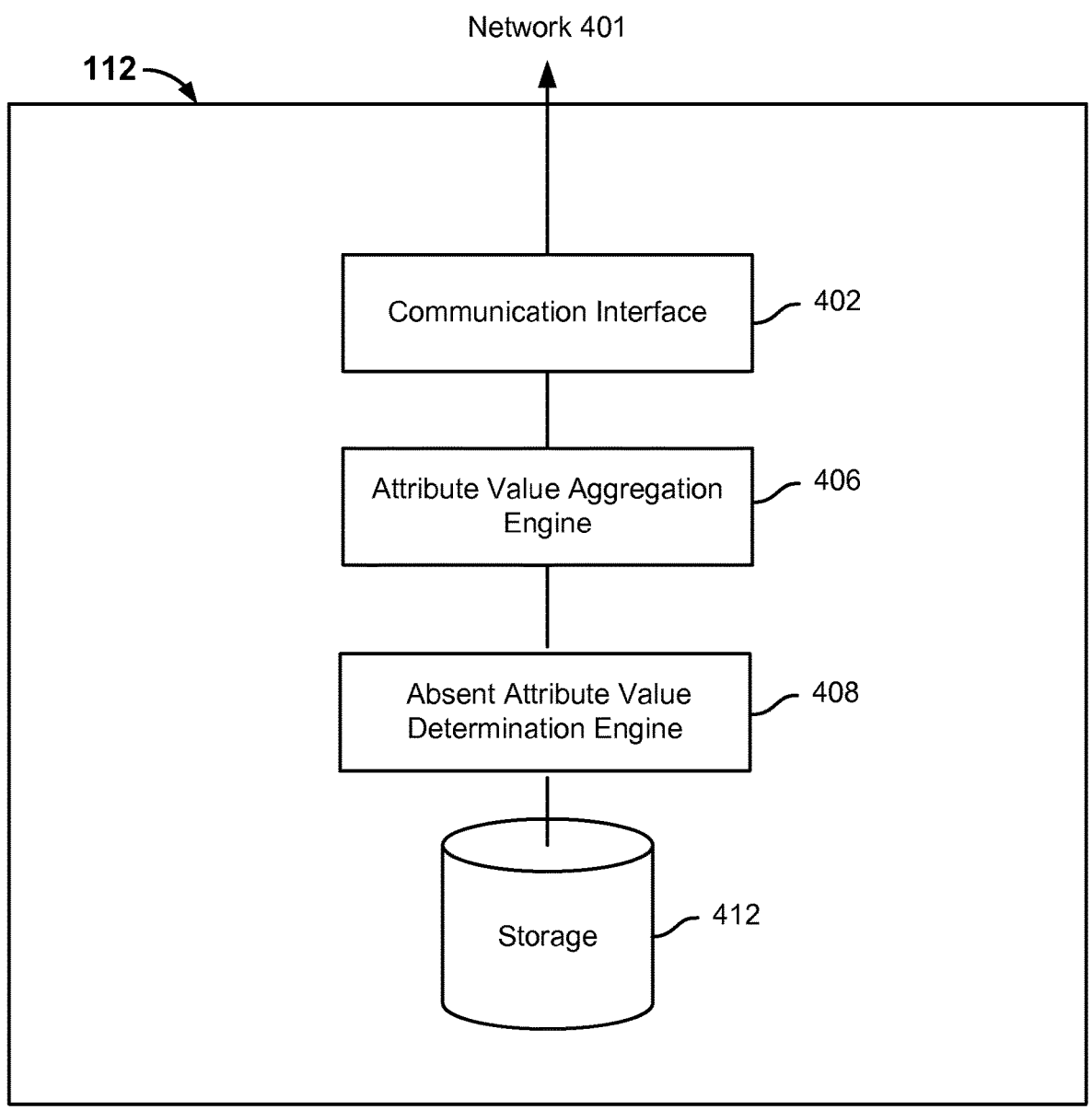
FIG. 4 is a block diagram illustrating an embodiment of a cluster VM management server.

FIG. 4 is a block diagram illustrating an embodiment of a cluster VM management server. In various embodiments, cluster VM management server 112 of FIG. 1 can be implemented using the example storage system of FIG. 4. In the example shown, cluster VM management server 112 includes a network connection 401 and a communication interface 402, such as a network interface card or other interface, which enable the cluster VM management server to be connected to and communicate via a network such as network 110 of FIG. 1. In various embodiments the cluster VM management server uses storage but does not implement its own storage system. In some embodiments, the cluster VM management server could be co-resident with one of the storage systems rather than running as a VM.

Cluster VM management server 112 further includes attribute value aggregation engine 406 and absent attribute value determination engine 408. Each of aggregation engine 406 and absent attribute value determination engine 408 is implemented using software, hardware, or a combination of software and hardware.

Attribute value aggregation engine 406 is configured to obtain and aggregate values associated with attributes associated with each cluster VM from one or more storage systems. For example, attribute value aggregation engine 406 is configured to poll attribute values from storage systems using a Representational State Transfer (REST) API. In various embodiments, attribute value aggregation engine 406 is configured to perform an aggregation event associated with each cluster VM on a periodic basis. For example, attribute value aggregation engine 406 performs an aggregation event at a predetermined interval of every 10 minutes and therefore, each aggregation event is identified by a time at which the aggregation event was performed. In another example, attribute value aggregation engine 406 performs an aggregation event in response to a detected predetermined event such as a user submitted request to aggregate data for the cluster VM. In various embodiments, attribute value aggregation engine 406 is configured to identify attribute values collected from multiple storage systems as being associated with the same VM based on the VM ID associated with the data.

In various embodiments, in aggregating values received from one or more storage systems for an attribute of a particular cluster VM during a particular aggregation event, attribute value aggregation engine 406 is configured to determine a cluster value using the obtained values based on an aggregation semantic associated with that attribute. In various embodiments, aggregation semantics associated with attributes are predetermined and stored (e.g., at storage 412). For example, the aggregation semantic associated with a static attribute such as a user given name for the cluster VM is to select the received user given VM name value from the storage system that has most recently communicated with a hypervisor associated with managing the VM. In another example, the aggregation semantic associated with a dynamic attribute such as an IOPS for the cluster VM is to sum together the IOPS values associated with the VM that were received from the multiple storage systems. Attribute value aggregation engine 406 is configured to store each cluster value associated with a corresponding cluster VM and aggregation event at storage 412.

However, in some embodiments, attribute value aggregation engine 406 does not store each obtained attribute value associated with a cluster VM from every member of the cluster for each aggregation event at storage 412, as this could increase the cost to store obtained attribute values by (in a worst case) the number of storage systems, and typically by 2-3 times.

Instead, in some embodiments, attribute value aggregation engine 406 is configured to store a single performance history (including cluster values for corresponding attributes across one or more aggregation events) for a cluster VM and also the last known attribute value of each attribute that was obtained from each storage system for the cluster VM at storage 412. The number of data points that may be remembered is thus equal to the size of the retained history, plus one attribute value per storage system, rather than the size of the retained history times the number of storage systems.

In some instances, attribute value aggregation engine 406 may be unable to connect to a particular storage system to obtain attribute values associated with a cluster VM during an aggregation event. For example, the storage system may be unresponsive due to a problem in the network over which the connection is being established or the storage system may be unresponsive because it has failed. In the event that attribute value aggregation engine 406 determines that a storage system has become unresponsive during an aggregation event, in some embodiments, attribute value aggregation engine 406 is configured to inform absent attribute value determination engine 408 about the storage system that was unresponsive to a request for a value for a particular attribute associated with a particular cluster VM during a particular aggregation event. In response, absent attribute value determination engine 408 is configured to determine an extrapolated value to temporarily use in place of the absent attribute value associated with the particular attribute associated with the particular cluster VM associated with the particular unresponsive storage system for the particular aggregation event. For example, absent attribute value determination engine 408 is configured to determine the extrapolated value associated with the particular attribute associated with the particular cluster VM associated with the particular unresponsive storage system for the particular aggregation event based on a historical value received from that storage system for the particular cluster VM at a previous aggregation event. Attribute value aggregation engine 406 is configured to determine a cluster value associated with the particular cluster VM and the particular aggregation event using the attribute values it did receive from the responsive storage systems and the extrapolated value.

In some embodiments, attribute value aggregation engine 406 may be able to contact a storage system that was previously unresponsive during one or more historical aggregation events. If a connection can be established with a previously unresponsive storage system, attribute value aggregation engine 406 is then able to obtain one or more attribute values associated with a cluster VM that were previously absent at the one or more historical aggregation events and update the stored cluster values associated with the attribute associated with the cluster VM associated with those one or more historical aggregation events using the received previously absent attribute values.

In some embodiments, absent attribute value determination engine 408 is configured to determine that the unresponsive system has failed and therefore informs attribute value aggregation engine 406 of this failure. For example, absent attribute value determination engine 408 can determine that the unresponsive system has failed if attribute value aggregation engine 406 has failed to connect to that storage system within a predetermined failure time period (e.g., seven days). In response to the determination that a storage system has failed, absent attribute value determination engine 408 is configured to determine an implied value to replace each extrapolated value (e.g., values that were used for that storage system during aggregation events in which the storage system was unresponsive) that were used for that storage system at one or more historical aggregation events. For example, the implied value associated with a failed storage system is zero. Attribute value aggregation engine 406 is then able to update the stored cluster values associated with the cluster VM associated with those one or more historical aggregation events using the implied values.

In various embodiments, attribute value aggregation engine 406 is configured to present the data aggregated for various cluster VMs at a user interface. In some embodiments, attribute value aggregation engine 406 is configured to present the cluster values associated with corresponding attributes of the cluster VMs across one or more aggregation events.

Figure 5:
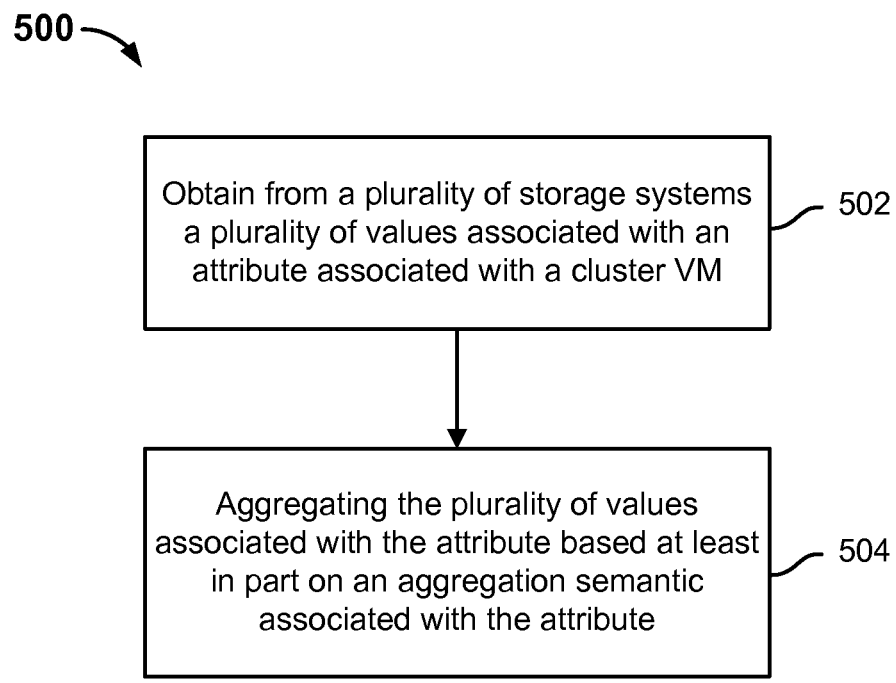
FIG. 5 is a flow diagram showing an embodiment of a process for aggregating data associated with a cluster VM.

FIG. 5 is a flow diagram showing an embodiment of a process for aggregating data associated with a cluster VM. In some embodiments, process 500 is implemented at a cluster VM management server such as cluster VM management server 112 of system 100 of FIG. 1.

At 502, a plurality of values associated with an attribute associated with a cluster VM is obtained from a plurality of storage systems. At the occurrence of a current aggregation event, the values associated with an attribute of a cluster VM are obtained from each of the storage systems that store data associated with that cluster VM. In some embodiments, the aggregation event associated with the attribute is performed at every predetermined interval for the cluster VM. In some embodiments, the aggregation event associated with the attribute is performed for the cluster VM in response to an event. The attribute values may be associated with live and/or synthetic data associated with the cluster VM. In some embodiments, the values associated with the same attribute are polled from the storage systems. In some embodiments, the values associated with the same attribute are sent from the storage systems. In some embodiments, the values associated with the attribute associated with the cluster VM that are obtained from the storage systems during the current aggregation event are incremental over the previous values associated with the attribute associated with the cluster VM that were obtained from the storage systems during a previous aggregation event. In some embodiments, the values associated with the attribute associated with the cluster VM that are obtained from the storage systems during the current aggregation event are cumulative with respect to the previous values associated with the attribute associated with the cluster VM that were obtained from the storage systems during a previous aggregation event.

At 504, the plurality of values associated with the attribute is aggregated based at least in part on an aggregation semantic associated with the attribute. The values associated with the attribute associated with the cluster VM that are obtained from the storage systems during the current aggregation event are aggregated to determine a cluster value associated with the attribute associated with the cluster VM for the current aggregation event using an aggregation semantic that is specific to that particular attribute. In some embodiments, the aggregation semantic associated with each attribute is predetermined and stored. In one example, the aggregation semantic associated with an attribute dictates to select a particular value obtained from a storage system for that attribute to use as the cluster value to be stored with the attribute associated with the current aggregation event. In another example, the aggregation semantic associated with an attribute dictates to combine the values obtained from the storage systems for that attribute to use as the cluster value to be stored with the attribute associated with the current aggregation event.

For example, it would be incorrect to add two latency attribute values (that were obtained from two respective storage systems) to get a cluster latency value. But it would also be incorrect to take the average of the two latency attribute values, since the two storage systems from which the attribute values of the cluster VM were obtained may have vastly different amounts of traffic. Instead, for example, a weighted average may be determined from the two latency attribute values to use as the cluster value associated with the latency attribute for the cluster VM for the current aggregation event because it is the best reflection of the latency that the cluster VM experienced.

Figure 6:
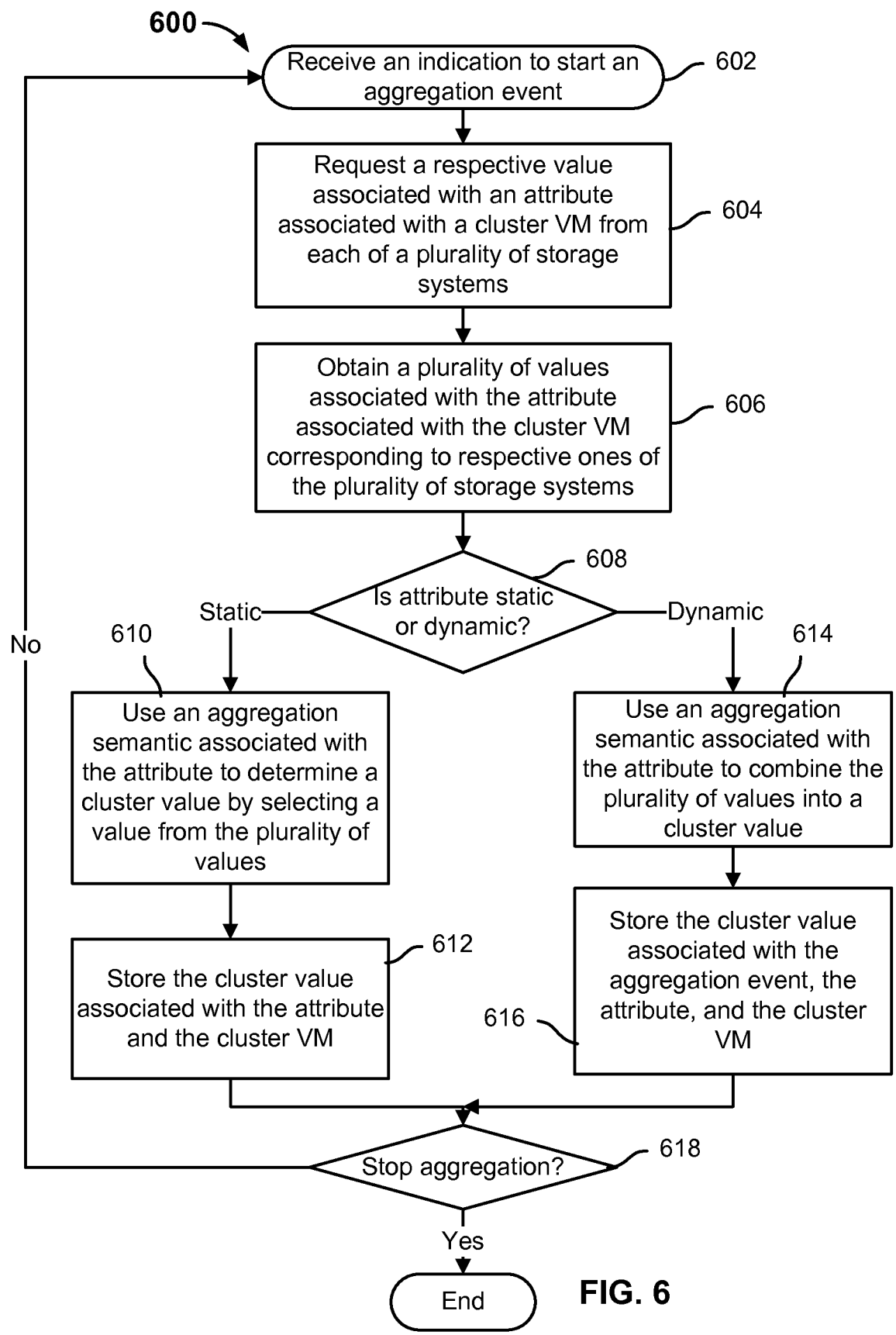
FIG. 6 is a flow diagram showing an example of a process for aggregating data associated with a cluster VM.

FIG. 6 is a flow diagram showing an example of a process for aggregating data associated with a cluster VM. In some embodiments, process 600 is implemented at a cluster VM management server such as cluster VM management server 112 of system 100 of FIG. 1. In some embodiments, process 500 of FIG. 5 is implemented using process 600.

Process 600 shows an example process of aggregating values for a particular attribute associated with a cluster VM from storage systems that are all responsive. A responsive storage system is a storage system to which a cluster VM management server is able to establish a connection and from which an attribute value can be obtained.

At 602, an indication to start an aggregation event is received. In some embodiments, an indication to start an aggregation event is received at every predetermined interval (e.g., 10 minutes). In some embodiments, an indication to start an aggregation event is received in response to a detection of an aggregation event-triggering event (e.g., a user submitted request to perform an aggregation with respect to an attribute associated with a particular cluster VM).

At 604, a respective value associated with an attribute associated with a cluster VM is requested from each of a plurality of storage systems. A value of a particular attribute associated with a VM is requested (e.g., polled) from each storage system that stores data associated with that VM. In some embodiments, the storage systems belong to a cluster.

At 606, a plurality of values associated with the attribute associated with the cluster VM corresponding to respective ones of the plurality of storage systems is obtained. In some embodiments, values associated with the attribute that are received from different storage systems can be identified as belonging to the same VM based at least in part on the unique VM ID that is associated with the received values. The attribute values with the same VM ID that are gathered from different storage systems are stored with a cluster VM object associated with that VM ID, which represents a "cluster-wide" view of the VM.

At 608, it is determined whether the attribute is a static attribute or a dynamic attribute. In the event that the attribute is a static attribute, control is transferred to 610. Otherwise, in the event that the attribute is a dynamic attribute, control is transferred to 614.

Examples of static attributes include a user given name of a VM, whether the VM is live or not, whether the VM has been deleted from a hypervisor's inventory, whether the VM has been powered on or off, file IDs, and an identifier of a hypervisor with which the VM is associated. Examples of dynamic attributes include attributes related to performance including IOPS, latency, throughput, storage space utilized by synthetic data, and storage space utilized by live data.

At 610, an aggregation semantic associated with the attribute is used to determine a cluster value by selecting a value from the plurality of values. While the aggregation semantic may differ for each attribute, in various embodiments, the aggregation semantics associated with static attributes include selecting one of the obtained values to serve as the cluster VM's cluster value for the attribute. In some embodiments, the aggregation semantic associated with a static attribute also dictates a preference of live data over synthetic data in the event of conflicting/inconsistent data. Put another way, if an obtained live data attribute value conflicted with or was inconsistent with an obtained synthetic data attribute value, then the live data attribute value is included in determining the cluster value while the synthetic data attribute value is ignored. In some embodiments, the aggregation semantic associated with a static attribute also dictates the preference of live data that was more recently obtained from a hypervisor over live data that was less recently obtained from the hypervisor in the event of conflicting/inconsistent data. In some embodiments, the aggregation semantic associated with a static attribute also dictates the preference of synthetic data with a more recent timestamp over synthetic data with a less recent timestamp. For example, if conflicting user given names were determined for the same VM from two different snapshots, then the user given name associated with the snapshot with the more recent snapshot creation time would be included in the selection of the cluster value associated with the current aggregation event while the conflicting user given name associated with the snapshot with the less recent snapshot creation time would be ignored.

Below are some example aggregation semantics associated with some static attributes:

1) Liveness attribute: if any value associated with the whether the VM is live attribute that is received from any storage system indicates that the VM is live, then the live value is selected as the cluster value associated with this attribute of the cluster VM.

2) Deleted attribute: if any value associated with the whether the VM is deleted from a hypervisor's inventory attribute that is received from any storage system indicates that the VM is undeleted, then the undeleted value is selected as the cluster value associated with this attribute of the cluster VM.

3) User given name attribute: if different values associated with the user given name attribute are received from different storage systems, then the user given name that is received from the storage system that had most recently communicated with the hypervisor that manages the VM is selected as the cluster value associated with this attribute of the cluster VM.

4) Hypervisor identifier attribute: if different values associated with the hypervisor identifier attribute are received from different storage systems, then the hypervisor identifier that is received from the storage system that had most recently communicated with the hypervisor that manages the VM is selected as the cluster value associated with this attribute of the cluster VM.

5) Powered on or off attribute: if different values associated with the powered on or off attribute are received from different storage systems, then the powered on or off value that is received from the storage system that had most recently communicated with the hypervisor that manages the VM is selected as the cluster value associated with this attribute of the cluster VM.

At 612, the cluster value associated with the attribute associated with the cluster VM is stored. The selected cluster value is stored with the attribute and the cluster VM. In some embodiments, each aggregation event is identified by an associated timestamp. In some embodiments, the cluster value is stored with the attribute and the cluster VM in addition to the timestamp associated with the current aggregation event. In some embodiments, the cluster value of a static attribute of a cluster VM at each of one or more aggregation events and their associated timestamps can be presented at a user interface to show the history of the cluster VM's static attribute.

At 614, an aggregation semantic associated with the attribute is used to combine the plurality of values into a cluster value. While the aggregation semantic may differ for each attribute, in various embodiments, the aggregation semantics associated with dynamic attributes include combining the obtained values together and using the combined value to serve as the cluster VM's cluster value for the attribute. The obtained values of different dynamic attributes may be combined in different ways. In some embodiments, the aggregation semantic associated with a dynamic attribute also dictates a preference of live data over synthetic data in the event of conflicting/inconsistent data. Put another way, if an obtained live data attribute value conflicted with or was inconsistent with an obtained synthetic data attribute value, then the live data attribute value is included in determining the cluster value while the synthetic data attribute value is ignored. In some embodiments, the aggregation semantic associated with a dynamic attribute also dictates the preference of live data that was more recently obtained from a hypervisor over live data that was less recently obtained from the hypervisor in the event of conflicting/inconsistent data. In some embodiments, the aggregation semantic associated with a dynamic attribute also dictates the preference of synthetic data with a more recent timestamp over synthetic data with a less recent timestamp. For example, if conflicting user given names were determined for the same VM from two different snapshots, then the user given name associated with the snapshot with the more recent snapshot creation time would be included in the determination of the cluster value associated with the current aggregation event while the conflicting user given name associated with the snapshot with the less recent snapshot creation time would be ignored.

Below are some example aggregation semantics associated with some dynamic attributes:

1) Read IOPS attribute: the cluster value of the read IOPS attribute associated with the VM is the sum of the read IOPS values that were received from the storage systems.

2) Throughput attribute: the cluster value of the throughput attribute associated with the VM is the sum of the throughput values that were received from the storage systems.

3) Latency attribute: the cluster value of the latency attribute associated with the VM is the sum of the products of the latency and throughput values associated with the VM that were received from each storage system divided by the sum of the latency values that were received from each storage system. For example, the cluster value of the latency attribute based on the latency and throughput values received from storage system A and storage system B can be determined as follows:

$$\frac{l_A \times tput_A + l_B \times tput_B}{tput_A + tput_B} \quad (1)$$

Where $l_A$ represents the latency value associated with the VM that is received from storage system A, $tput_A$ represents the throughput value associated with the VM that is received from storage system A, $l_B$ represents the latency value associated with the VM that is received from storage system B, and $tput_B$ represents the throughput value associated with the VM that is received from storage system B.

4) Live data storage space utilization attribute: the cluster value of the live data storage space utilization attribute is determined as the sum of the live data storage space utilization values that were received from the storage systems.

5) Synthetic data storage space utilization attribute: the cluster value of the synthetic data storage space utilization attribute is determined as the sum of the synthetic data storage space utilization values that were received from the storage systems.

At 616, the cluster value associated with the aggregation event, the attribute, and the cluster VM is stored. In some embodiments, each aggregation event is identified by an associated timestamp. The cluster value is stored with the attribute and the cluster VM in addition to the timestamp associated with the current aggregation event. In some embodiments, the cluster value of a dynamic attribute of a cluster VM at each of one or more aggregation events and their associated timestamps can be presented at a user interface to show the history of the cluster VM's dynamic attribute. For example, if the dynamic attribute represented a performance measurement associated with the cluster VM, then the cluster values of the dynamic attribute of the cluster VM at each of one or more aggregation events and their associated timestamps can be shown in a graph presentation of performance over time of the cluster VM.

At 618, it is determined whether aggregation events should be stopped. In the event that aggregation events should be stopped, process 600 ends. Otherwise, in the event that aggregation events should not be stopped, control is returned to 602. For example, if aggregating attribute values associated with the cluster VM is no longer desired and/or the cluster VM management server is shut down, process 600 may end.

Figure 7:
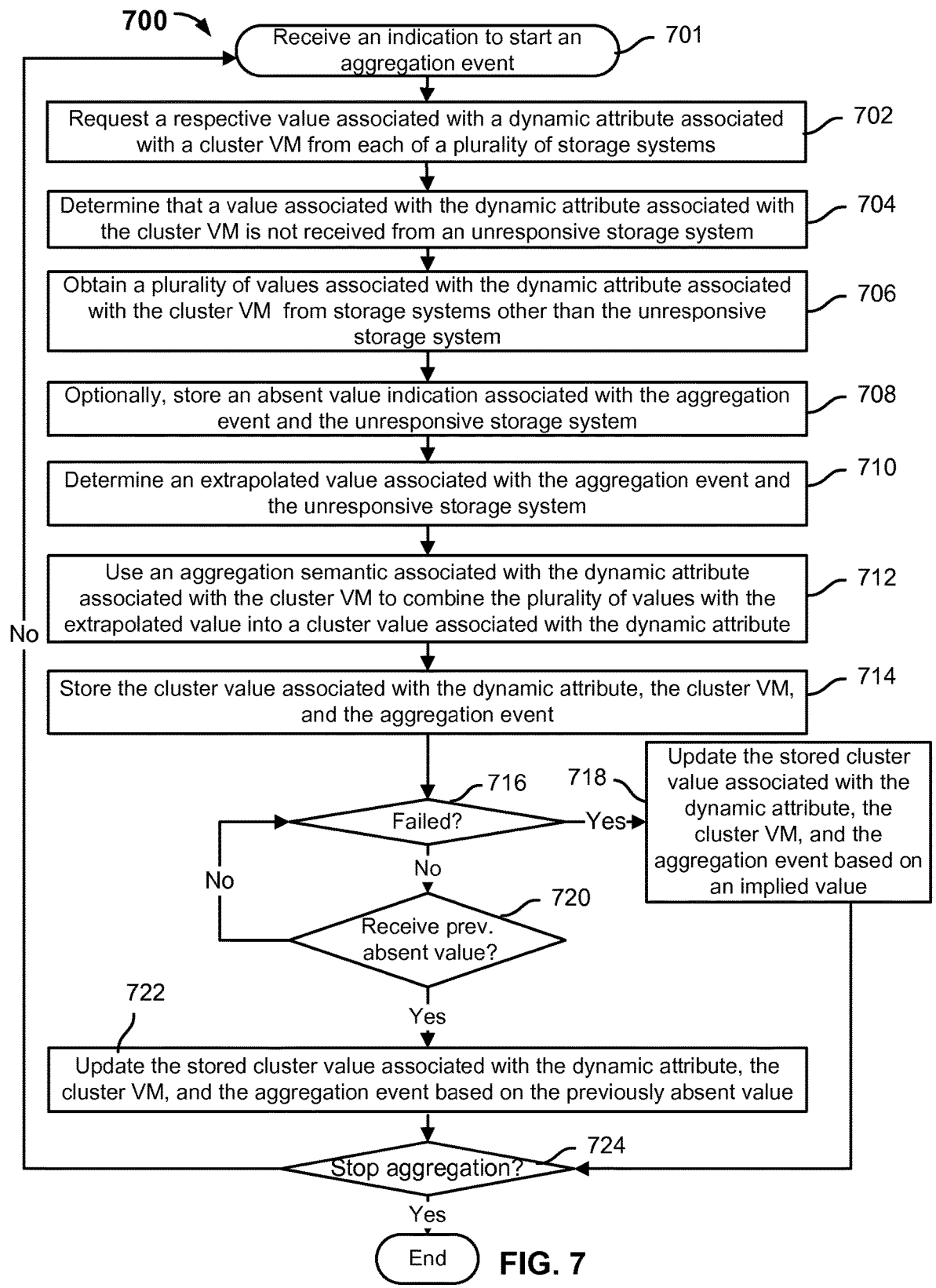
FIG. 7 is a flow diagram showing an example of a process for aggregating dynamic data associated with a cluster VM.

FIG. 7 is a flow diagram showing an example of a process for aggregating dynamic data associated with a cluster VM. In some embodiments, process 700 is implemented at a cluster VM management server such as cluster VM management server 112 of system 100 of FIG. 1. In some embodiments, process 500 of FIG. 5 is implemented using process 700.

Process 700 shows an example process of aggregating values for a particular dynamic attribute associated with a cluster VM from storage systems in which at least one storage system is determined to be unresponsive. An unresponsive storage system is a storage system to which a cluster VM management server is unable to establish a connection and from which an attribute value is unable to be obtained. Because, in various embodiments, dynamic attributes represent performance information associated with a cluster VM over time, it is undesirable for the performance behavior of a cluster VM to appear erratic as information from unresponsive storage systems is absent or delayed. Process 700 provides a data aggregating technique for handling the case of an unresponsive storage system and also the case in which the unresponsive storage system is then determined to have failed.

At 701, an indication to start an aggregation event is received. In some embodiments, an indication to start an aggregation event is received at every predetermined interval (e.g., 10 minutes). In some embodiments, an indication to start an aggregation event is received in response to a detection of an aggregation event-triggering event (e.g., a user submitted request to perform an aggregation with respect to an attribute associated with a particular cluster VM).

At 702, a respective value associated with a dynamic attribute associated with a cluster VM is requested from each of a plurality of storage systems. A value of a particular dynamic attribute associated with a VM is requested (e.g., polled) from each storage system that stores data associated with that VM. In some embodiments, the storage systems belong to a cluster.

At 704, it is determined that a value associated with the dynamic attribute associated with the cluster VM is not received from an unresponsive storage system. In some embodiments, a timeout period is used to wait for the attribute value to be received from each storage system. If the attribute value is not received from a particular storage system prior to the elapse of the timeout period, then the particular storage system is determined to be unresponsive. In some embodiments, a storage system whose information is not up-to-date (at the time of the aggregation event) is determined to be an unresponsive storage system. Suppose the aggregation event occurs shortly after 10:00 AM and data associated with 10:00 AM is received from storage system A but not from storage system B. Then storage system B is treated as unresponsive, temporarily, at least initially. As will be described in further detail below, whether an unresponsive storage system is only temporarily unresponsive or has actually failed can be determined retrospectively.

At 706, a plurality of values associated with the dynamic attribute associated with the cluster VM is obtained from storage systems other than the unresponsive storage system. Values associated with the dynamic attribute associated with the cluster VM are obtained from the remaining responsive storage systems.

At 708, optionally, an absent value indication associated with the aggregation event and the unresponsive storage system is stored. In some embodiments, an absent value indication that indicates that the value associated with the dynamic attribute associated with the cluster VM was not received from the unresponsive storage system in the current aggregation event is stored. The stored absent value indication may be used to identify that at least one extrapolated value was used to determine the cluster value associated with the dynamic attribute associated with the cluster VM for an aggregation event. Similarly, if the absent value associated with a particular aggregation event is later received because the previously unresponsive storage system has recovered from failure, then the absent value indication can be used to identify which cluster value should be updated using the received value that was previously absent.

At 710, an extrapolated value associated with the aggregation event and the unresponsive storage system is determined. Since the value associated with the dynamic attribute associated with the cluster VM was not received from the unresponsive storage system in the current aggregation event, rather than assuming that the absent attribute value is zero, which could lead to a noticeable "dip" that most likely does not correspond to reality (assuming that network outages are more common than true failures), an extrapolated value is determined and used as the value associated with the dynamic attribute associated with the cluster VM that was not received from the unresponsive storage system in the current aggregation event. For example, if the dynamic attribute was storage space utilized, assuming that the storage space utilized by the cluster VM's data at the unresponsive storage system is zero would be unrealistic and misleading. In various embodiments, it is better to extrapolate unknown data than to assume complete failure on the part of the unresponsive storage system. Therefore, the cluster value associated with the dynamic attribute associated with the cluster VM can be determined for the current aggregation event using the extrapolated value without needing to indicate an abrupt drop at the current aggregation event in the performance history of that dynamic attribute of the cluster VM.

In various embodiments, the extrapolated value is determined from a value associated with the dynamic attribute associated with the cluster VM that was received from the currently unresponsive storage system during a previous aggregation event. For example, the value associated with the dynamic attribute associated with the cluster VM that was last known/received during a previous aggregation event is determined as the extrapolated value in the current aggregation event.

For example, if the dynamic attribute is IOPS and the last IOPS value associated with a particular cluster VM that was received from a currently unresponsive storage system is 100, then the extrapolated IOPS value associated with the currently unresponsive storage system at the current aggregation event is 100.

At 712, an aggregation semantic associated with the dynamic attribute associated with the cluster VM is used to combine the plurality of values with the extrapolated value into a cluster value associated with the dynamic attribute. The extrapolated value associated with the unresponsive storage system is combined with the values received from the other, responsive storage systems based on the aggregation semantic associated with that dynamic attribute.

For example, assume that the dynamic attribute is IOPS and the IOPS values of 300, 240, and 290 were received from three respective responsive storage systems and the extrapolated IOPS value determined for the fourth, unresponsive storage system is 100. Assuming that the aggregation semantic of the IOPS attribute is to sum together all the individual IOPS values that were obtained from different storage systems, then the cluster value determined for the IOPS attribute of the cluster VM for the current aggregation event would be (300+240+290+100=930).

At 714, the cluster value associated with the dynamic attribute, the cluster VM, and the aggregation event is stored. In some embodiments, the cluster value associated with the dynamic attribute and the cluster VM is stored with a time that can be used to identify the current aggregation event.

At 716, it is determined whether the unresponsive storage system has failed. In various embodiments, the unresponsive storage system is assumed to have failed if the cluster VM management server fails to establish a connection with the storage system for a predetermined failure time period. For example, the predetermined failure time period is seven days. As such, if a storage system remains to be unresponsive for the duration of the predetermined failure time period, then retrospectively, the storage system will be treated as having failed from the start of the unresponsiveness. However, if the cluster VM management server is able to establish a connection with the storage system prior to the elapse of the predetermined failure time period, then the storage system is determined to have recovered and that the outage was only temporary.

In the event that the unresponsive storage system has failed (e.g., the unresponsive storage system remains to be unresponsive for the duration of the predetermined failure time period), control is transferred to 718. Otherwise, in the event that the unresponsive storage system has not failed (e.g., the storage system becomes responsive prior to the end of the predetermined failure time period), control is transferred to 720.

At 718, the stored cluster value associated with the dynamic attribute, the cluster VM, and the aggregation event is updated based on an implied value. The stored cluster value that was determined using the extrapolated value in the current aggregation event is updated based on an implied value that is predetermined for a failed storage system. For example, the implied value that is predetermined for the failed storage system is zero. In various embodiments, the cluster value associated with the current aggregation event is updated by removing the extrapolated value and adding the implied value in a manner that is determined by the aggregation semantic associated with the dynamic attribute.

In the event that the failed storage system had been unresponsive for one or more previous aggregation events in addition to the current aggregation event, then the cluster values stored for those one or more previous aggregation events can also be similarly updated using the implied value that is predetermined for a failed storage system.

At 720, it is determined whether the previously absent value associated with the dynamic attribute associated with the cluster VM is received from the previously unresponsive storage system. In various embodiments, if the previously absent value associated with the current aggregation event is received from the unresponsive storage system prior to the elapse of the predetermined failure time period, then the unresponsive storage system is determined to have recovered and is now responsive. In the event that the previously absent value associated with the dynamic attribute associated with the cluster VM is received from the previously unresponsive storage system prior to the elapse of the predetermined failure time period, control is transferred to 722. Otherwise, in the event that the previously absent value associated with the dynamic attribute associated with the cluster VM is not received from the previously unresponsive storage system prior to the elapse of the predetermined failure time period, control is returned to 716, in which it is determined whether the predetermined failure time period has completely elapsed.

At 722, the stored cluster value associated with the dynamic attribute, the cluster VM, and the aggregation event is updated based on the previously absent value. The stored cluster value that was determined using the extrapolated value in the current aggregation event is updated based on the previously absent value that was received. In various embodiments, the cluster value associated with the current aggregation event is updated by removing from the cluster value the extrapolated value and then adding the previously absent value to the cluster value in a manner that is determined by the aggregation semantic associated with the dynamic attribute.

In the event that the recovered storage system had been unresponsive for one or more previous aggregation events in addition to the current aggregation event, in some embodiments, not every absent value associated with those previously one or more aggregation events may be recoverable and therefore, those corresponding cluster values may not be able to be updated.

At 724, it is determined whether aggregation events should be stopped. In the event that aggregation events should be stopped, process 700 ends. Otherwise, in the event that aggregation events should not be stopped, control is returned to 701. For example, if aggregating attribute values associated with the cluster VM is no longer desired and/or the cluster VM management server is shut down, process 700 may end.

Figure 8B:
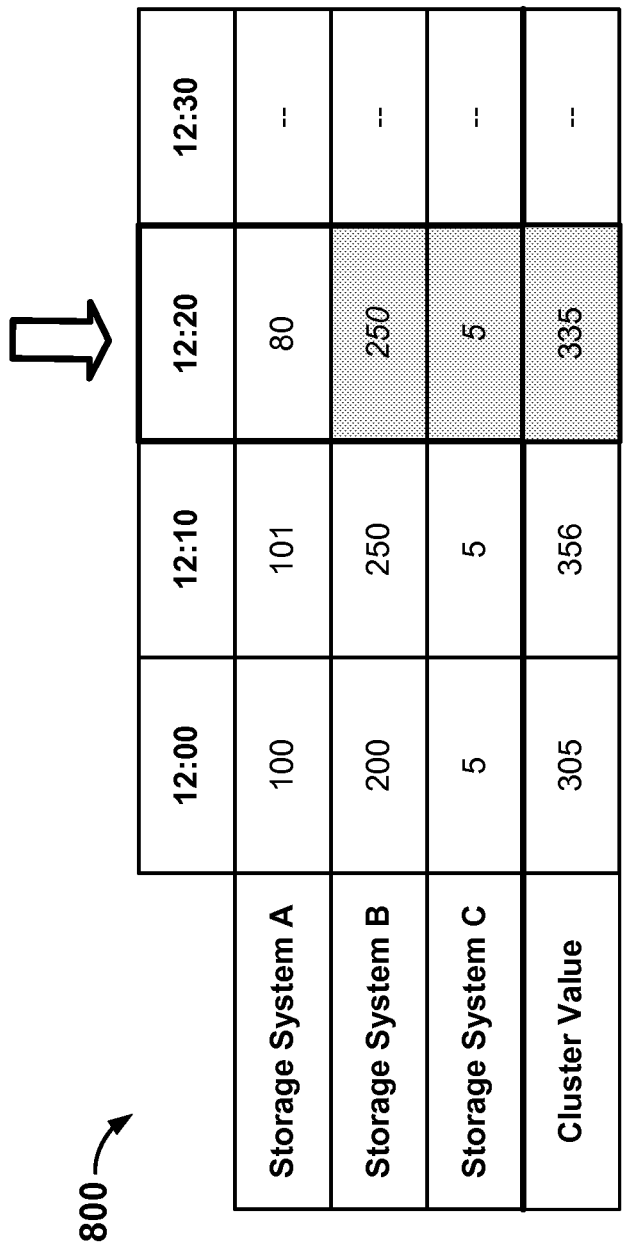
Figure 8C:

FIGS. 8A, 8B, and 8C describe a first example of storing cluster values associated with a cluster VM.

In the example associated with FIGS. 8A, 8B, and 8C, incremental values associated with the dynamic attribute of IOPS are aggregated every 10 minutes for the cluster VM identified by the VM ID of "123" from storage system A, storage system B, and storage system C. An incremental value means that the value was collected since the previous aggregation event. Because the aggregation events occur at predetermined time intervals, each aggregation event is identified by a time. The aggregation semantic associated with the dynamic attribute of IOPS dictates to sum together the IOPS values collected from the different storage systems to determine the cluster IOPS value at each time.

The example associated with FIGS. 8A, 8B, and 8C shows that each attribute value that is received from or extrapolated for each storage system at each aggregation event time is stored in data structure 800. As such, the number of data points that is stored in the example of FIGS. 8A, 8B, and 8C is thus equal to the size of the retained history times number of storage systems. In some embodiments, data structure 800 is stored by a cluster VM management server such as cluster VM management server 112 of system 100 of FIG. 1. In some embodiments, data structure 800 is updated using a process such as process 700 of FIG. 7.

FIG. 8A shows that a previous aggregation event is associated with the aggregation event time 12:00, at which IOPS values of 100, 200, and 5 associated with cluster VM ID 123 were respectively received from storage systems A, B, and C. The cluster IOPS value associated with cluster VM ID 123 at the aggregation event time of 12:00 is thus the sum of the obtained IOPS values (100+200+5=305). Furthermore, FIG. 8A shows that the current aggregation event is associated with the aggregation event time 12:10, at which IOPS values of 101, 250, and 5 associated with cluster VM ID 123 are respectively received from storage systems A, B, and C. The cluster IOPS value associated with cluster VM ID 123 at the aggregation event time of 12:10 is thus the sum of the obtained IOPS values (101+250+5=356).

FIG. 8B shows that the current aggregation event is now associated with the aggregation event time 12:20, at which the IOPS value of 80 associated with cluster VM ID 123 is received from storage system A but storage systems B and C are unresponsive. Thus, extrapolated IOPS values are determined for unresponsive storage systems B and C at aggregation event time 12:20. In the example of FIG. 8B, the extrapolated IOPS value for an unresponsive storage system is the last known IOPS value that was obtained from that storage system. The last known IOPS values for storage systems B and C were respectively 250 and 5 that were obtained at previous aggregation event time 12:10. As such, the extrapolated IOPS values determined for storage systems B and C at aggregation event time 12:20 are respectively 250 and 5. The cluster IOPS value associated with cluster VM ID 123 at the aggregation event time of 12:20 is thus the sum of the obtained and extrapolated IOPS values (80+250+5=335).

Optionally, data is stored to indicate that storage systems B and C were unresponsive associated with the aggregation event time 12:20 and that therefore, the cluster value associated with the aggregation event time 12:20 is determined, in part, on extrapolated IOPS values.

FIG. 8C shows that the current aggregation event is now associated with the aggregation event time 12:30, at which the IOPS values of 1000 and 310 associated with cluster VM ID 123 are respectively received from storage systems A and B but storage system C remains unresponsive. Furthermore, now that storage system B has recovered, storage system B's previously absent IOPS value of 300 (as shown in underline in the diagram) associated with the previous aggregation event time 12:20 is also obtained. As such, the cluster IOPS value associated with the previous aggregation event time 12:20 is updated using the previously absent IOPS value of 300. Therefore, the updated cluster IOPS value associated with the previous aggregation event time 12:20 is updated by subtracting out the extrapolated IOPS value and adding the previously absent IOPS value to the previously determined cluster IOPS value (335−250+300=385).

However, because storage system C remains unresponsive, an extrapolated IOPS value is determined for storage system C at aggregation event time 12:30. The extrapolated IOPS value is determined for storage system C at aggregation event time 12:30 based on its last known value of 5 at aggregation event time 12:10. The cluster IOPS value associated with cluster VM ID 123 at the aggregation event time of 12:30 is thus the sum of the obtained and extrapolated IOPS values (1000+310+5=1315).

Optionally, data is stored to indicate that storage system C was unresponsive associated with the aggregation event time 12:30 and that therefore, the cluster value associated with the aggregation event time 12:30 is determined, in part, on an extrapolated IOPS value.

While not shown in the diagram of FIG. 8C, in various embodiments, if storage system C continues to be unresponsive for the duration of a predetermined failure time period (e.g., seven days), then storage system C is determined to have failed. In response to the determination that storage system C has failed, each of storage system C's extrapolated values since the start of its failure (aggregation event time 12:20) is rewritten as an implied value predetermined for a failed storage system and the cluster values corresponding to the affected aggregation events can be accordingly updated. For example, if the implied value predetermined for a failed storage system is zero, then the cluster IOPS value stored for aggregation event time 12:30 can be updated by subtracting out the extrapolated value associated with the aggregation event time of 12:30 and adding the implied value (1315−5+0=1310).

In some embodiments, the cluster values of the IOPS of cluster VM 123 across one or more aggregation events of data structure 800 can be presented at a user interface. For example, the user interface may present a graph of the cluster values of the IOPS of cluster VM 123 plotted against the aggregation event times so that a viewing user may see a time series of the aggregated IOPS of the cluster VM across the cluster of storage systems including storage systems A, B, and C.

Data structure 800 of the example of FIGS. 8A, 8B, and 8C stores a complete history of the attribute values obtained from the storage systems across multiple historical aggregation events. However, storing the complete history of the attribute values obtained from the storage systems across multiple historical aggregation events can be storage space inefficient as the number of aggregation events and/or storage systems increases. Another example of storing cluster values associated with a cluster VM in a manner that is more storage space efficient than the example of FIGS. 8A, 8B, and 8C is described with FIGS. 9A, 9B, and 9C, below.

Figure 9A:
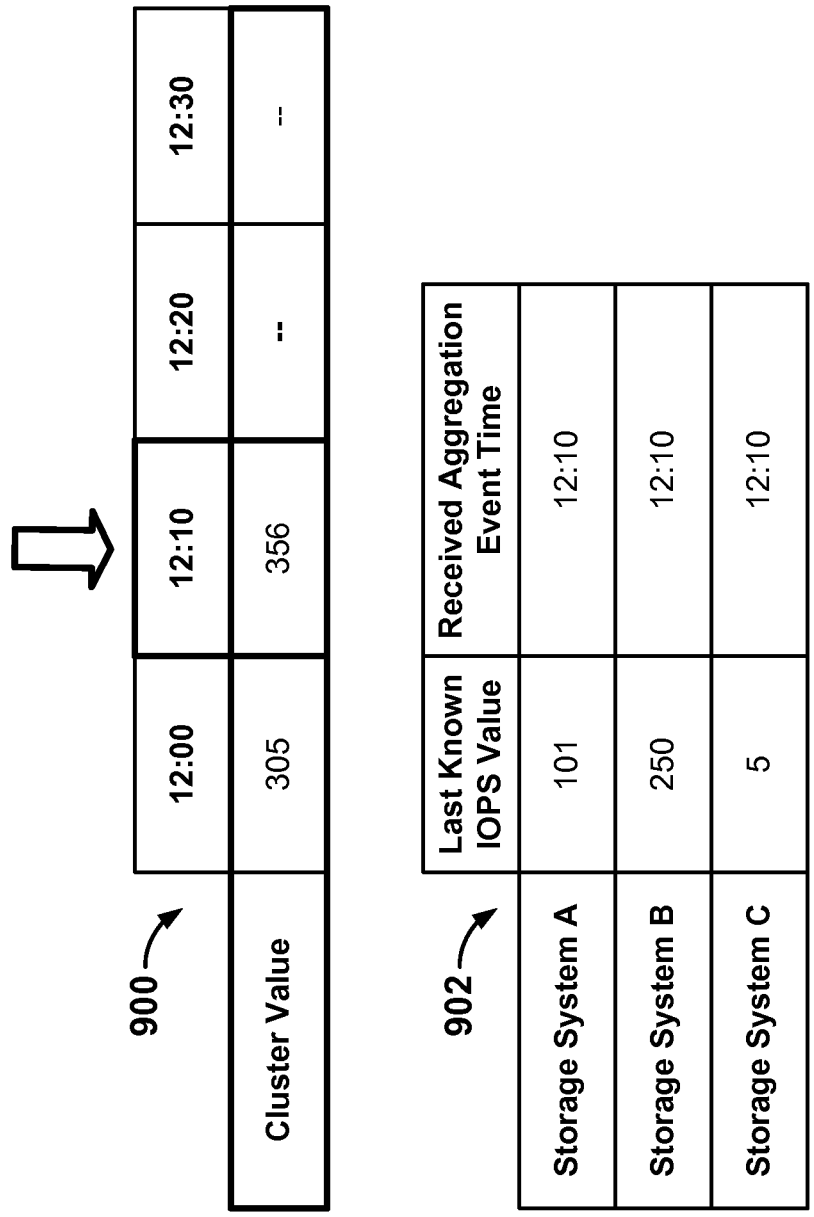
Figure 9C:
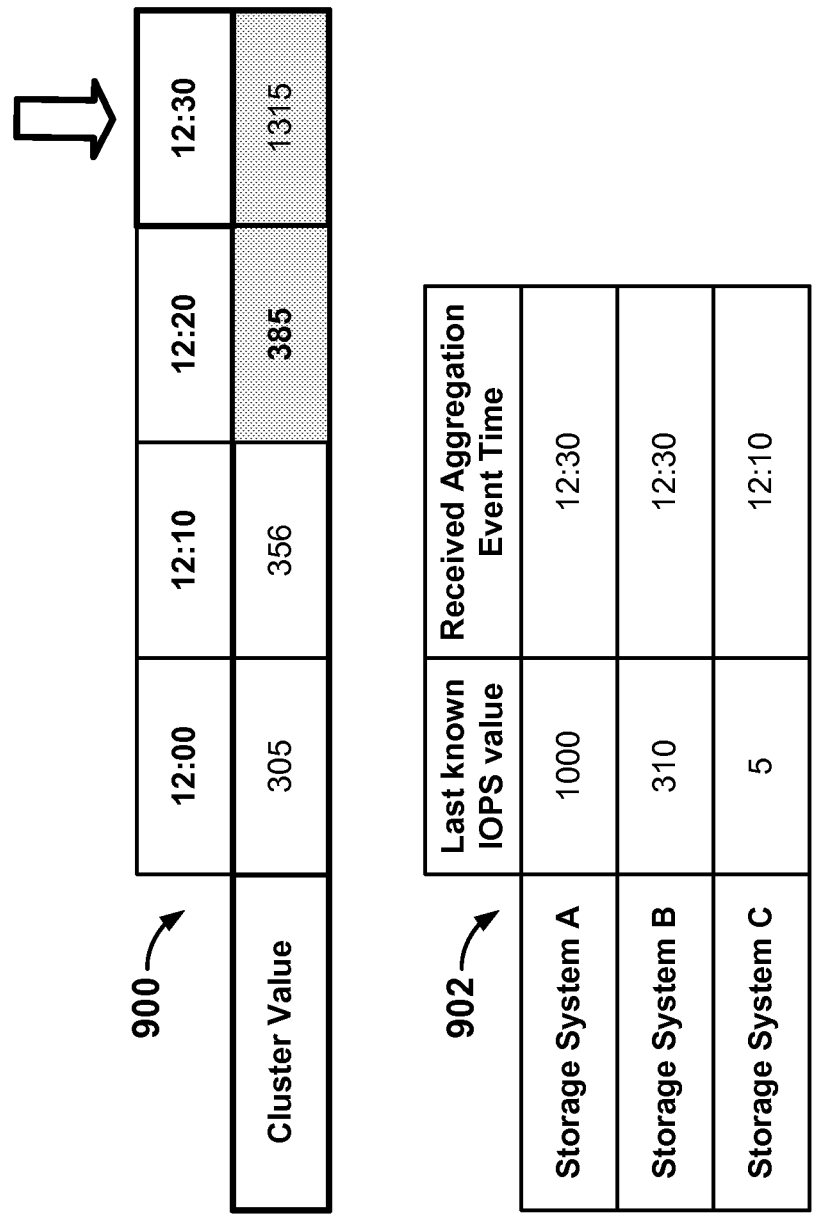

FIGS. 9A, 9B, and 9C describe a second example of storing cluster values associated with a cluster VM.

In the example associated with FIGS. 9A, 9B, and 9C, incremental values associated with the dynamic attribute of IOPS are aggregated every 10 minutes for the cluster VM identified by the VM ID of "123" from storage system A, storage system B, and storage system C. An incremental value means that the value was collected since the previous aggregation event. Because the aggregation events occur at predetermined time intervals, each aggregation event is identified by a time. The aggregation semantic associated with the dynamic attribute of the IOPS dictates to sum together the IOPS values collected from the different storage systems to determine the cluster IOPS value at each time.

The example associated with FIGS. 9A, 9B, and 9C shows data being stored in two data structures, 900 and 902. Data structure 900 stores the history of cluster IOPS values over various aggregation event times and data structure 902 stores the last IOPS value that was obtained from each storage system and the corresponding aggregation event time at which the IOPS value was obtained. The last attribute value that is obtained from a storage system is sometimes referred to as the "last known attribute value." As such, data structure 902 stores last known IOPS values from the storage systems and the corresponding aggregation event times at which the last known IOPS values were obtained. The number of data points that may be stored in the example of FIGS. 9A, 9B, and 9C is thus equal to the size of the retained history, plus one measurement per storage system, rather than the size of the retained history times the number of storage systems, as is done in the example of FIGS. 8A, 8B, and 8C. As will be described below, in the example of FIGS. 9A, 9B, and 9C, if a storage system becomes unresponsive during an aggregation event, then the extrapolated value determined for that storage system is determined using the last known attribute value associated with that storage system (i.e., it is assumed that the attribute value has not changed for the unresponsive storage system since the last received attribute value).

As the number of aggregation events or the number of storage systems increases, the manner of storing data that is used in the example of FIGS. 8A, 8B, and 8C quickly becomes much more costly than the manner of storing data that is used in the example of FIGS. 9A, 9B, and 9C. In some embodiments, data structures 900 and 902 are stored by a cluster VM management server such as cluster VM management server 112 of system 100 of FIG. 1. In some embodiments, data structures 900 and 902 are updated using a process such as process 700 of FIG. 7.

FIG. 9A shows a current aggregation event that is associated with the aggregation event time 12:10, at which IOPS values of 101, 250, and 5 associated with cluster VM ID 123 were respectively received from storage systems A, B, and C. As such, data structure 902 is updated to store IOPS values of 101, 250, and 5 as the respective last known IOPS values of storage systems A, B, and C with the corresponding received aggregation event time of 12:10. Data structure 900 is updated with the cluster IOPS value associated with cluster VM ID 123 at the aggregation event time of 12:10, which is the sum of the obtained IOPS values (101+250+5=356).

FIG. 9B shows that the current aggregation event is now associated with the aggregation event time 12:20, at which the IOPS value of 80 associated with cluster VM ID 123 is received from storage system A but storage systems B and C are unresponsive. As such, data structure 902 is updated to store the IOPS value of 80 as the last known IOPS value of storage system A with the corresponding received aggregation event time of 12:20. Since IOPS values associated with cluster VM ID 123 were not obtained from unresponsive storage systems B and C at aggregation event time 12:20, extrapolated IOPS values are determined for unresponsive storage systems B and C at aggregation event time 12:20. In the example of FIG. 9B, the extrapolated IOPS value for an unresponsive storage system is the last known IOPS value that was obtained from that storage system. By looking up data structure 902, the last known IOPS values for storage systems B and C can be determined respectively as 250 and 5, which were obtained at previous aggregation event time 12:10. As such, the extrapolated IOPS values determined for storage systems B and C at aggregation event time 12:20 are respectively 250 and 5. Data structure 900 is updated with the cluster IOPS value associated with cluster VM ID 123 at the aggregation event time of 12:20, which is thus the sum of the obtained and extrapolated IOPS values (80+250+5=335).

Optionally, data is stored to indicate that storage systems B and C were unresponsive associated with the aggregation event time 12:20 and that therefore, the cluster value associated with the aggregation event time 12:20 is determined, in part, on extrapolated IOPS values. Alternatively, no such data indicative of unresponsive storage systems is stored because the cluster IOPS value stored for aggregation event time of 12:20 can be inferred to have been computed based on extrapolated values by determining that at least some of the last known IOPS values stored in data structure 902 are associated with aggregation event times prior to 12:20.

FIG. 9C shows that the current aggregation event is now associated with the aggregation event time 12:30, at which the IOPS values of 1000 and 310 associated with cluster VM ID 123 are respectively received from storage systems A and B but storage system C remains unresponsive. As such, data structure 902 is updated to store the IOPS values of 1000 and 310 as the respective last known IOPS values of storage systems A and B with the corresponding received aggregation event time of 12:30. Furthermore, now that storage system B has recovered, storage system B's previously absent IOPS value of 300 (which is not shown in the diagram) associated with the previous aggregation event time 12:20 is also able to be obtained. As such, the cluster IOPS value associated with the previous aggregation event time 12:20 is updated using the previously absent IOPS value of 300. Data structure 900 is updated with the updated cluster IOPS value associated with the previous aggregation event time 12:20, which is determined by subtracting out the extrapolated IOPS value and adding the previously absent IOPS value to the previously determined cluster IOPS value (335−250+300=385).

However, because storage system C remains unresponsive, an extrapolated IOPS value is determined for storage system C at aggregation event time 12:30. The extrapolated IOPS value is determined for storage system C at aggregation event time 12:30 based on its last known value of 5 at aggregation event time 12:10 as indicated in data structure 902. Data structure 900 is updated with the cluster IOPS value associated with cluster VM ID 123 at the aggregation event time of 12:30, which is the sum of the obtained and extrapolated IOPS values (1000+310+5=1315).

Optionally, data is stored to indicate that storage system C was unresponsive associated with the aggregation event time 12:30 and that therefore, the cluster value associated with the aggregation event time 12:30 is determined, in part, on an extrapolated IOPS value. Alternatively, no such data indicative of unresponsive storage systems is stored because the cluster IOPS value stored for aggregation event time of 12:30 can be inferred to have been computed based on extrapolated values by determining that at least some of the last known IOPS values stored in data structure 902 are associated with aggregation event times prior to 12:30.

While not shown in the diagram of FIG. 9C, in various embodiments, if storage system C continues to be unresponsive for the duration of a predetermined failure time period (e.g., seven days), then storage system C is determined to have failed. In response to the determination that storage system C has failed, each of storage system C's extrapolated values since the start of its failure (aggregation event time 12:20) is rewritten as an implied value predetermined for a failed storage system and the cluster values corresponding to the affected aggregation events can be accordingly updated. For example, if the implied value predetermined for a failed storage system is zero, then the cluster IOPS value stored for aggregation event time 12:30 can be updated by subtracting out the extrapolated value associated with aggregation event time of 12:30 and adding the implied value (1315−5+0=1310).

In some embodiments, the cluster values of the IOPS of cluster VM 123 across one or more aggregation events of data structure 900 can be presented at a user interface. For example, the user interface may present a graph of the cluster values of the IOPS of cluster VM 123 plotted against the aggregation event times so that a viewing user may see a time series of the aggregated IOPS of the cluster VM across the cluster of storage systems including storage systems A, B, and C.

While the technique of storing attribute values as described in the example of FIGS. 9A, 9B, and 9C may be more storage space efficient than the technique of storing attribute values as described in the example of FIGS. 8A, 8B, and 8C, in actual implementation, any technique, including that which is described in the example of FIGS. 8A, 8B, and 8C may be used to track the attribute values obtained for an attribute of a cluster VM over various aggregation events.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
request a first value and a second value each associated with an attribute of a cluster VM, wherein the cluster VM represents a state of a virtual machine distributively stored across a plurality of storage systems and a first portion of the cluster VM is stored at a first storage system included in the plurality of storage systems and a second portion of the cluster VM is stored at a second storage system included in the plurality of storage systems;
receive the first value from the first storage system and the second value from the second storage system, wherein the first value is associated with the first portion of the cluster VM and the second value is associated with the second portion of the cluster VM;
determine an attribute of the cluster VM using the first value from the first storage system and the second value from the second storage system according to an aggregation semantic, wherein the attribute includes an association with live data currently tracked by a hypervisor and an association with synthetic data not currently tracked by the hypervisor, the determination including:
in response to a determination that there is at least one live value, discarding synthetic values, wherein a synthetic value represents a synthesized state of the cluster VM;
in response to a determination that there are no live values, discarding those values older than the newest synthetic value;
in response to a determination that the cluster VM attribute is static, determine a cluster VM attribute value by selecting one of the first value and the second value; and
in response to a determination that the cluster VM attribute is dynamic, determine the cluster VM attribute value by combining the first value and the second value; and
a memory coupled to the processor and configured to store the aggregation semantic associated with the attribute.

2. The system of claim 1, wherein the cluster VM represents aggregated data associated with a VM across the plurality of storage systems.

3. The system of claim 1, wherein the processor is further configured to:
  determine that a third value associated with the attribute associated with the cluster VM is not obtained from an unresponsive storage system of the plurality of storage systems; and
  determine an extrapolated value associated with the attribute associated with the cluster VM associated with the unresponsive storage system.

4. The system of claim 3, wherein the extrapolated value associated with the attribute associated with the cluster VM associated with the unresponsive storage system is determined based at least in part on a historical value associated with the attribute associated with the cluster VM that was previously obtained from the unresponsive storage system.

5. The system of claim 3, wherein the plurality of values is obtained from storage systems of the plurality of storage systems other than the unresponsive storage system and wherein to aggregate the plurality of values associated with the attribute comprises to determine a cluster value using the plurality of values and the extrapolated value.

6. The system of claim 5, wherein the processor is further configured to:
  receive a previously absent value associated with the attribute associated with the cluster VM from the unresponsive storage system; and
  in response to the receipt of the previously absent value associated with the attribute associated with the cluster VM from the unresponsive storage system:
    determine that the unresponsive storage system has become responsive; and
    update the cluster value by removing the extrapolated value using the aggregation semantic associated with the attribute and adding the previously absent value using the aggregation semantic associated with the attribute.

7. The system of claim 5, wherein the processor is further configured to:
  determine that the unresponsive storage system has failed; and
  in response to the determination that the unresponsive storage system has failed:
    obtain an implied value predetermined for a failed storage system; and
    update the cluster value by removing the extrapolated value using the aggregation semantic associated with the attribute and adding the implied value using the aggregation semantic associated with the attribute.

8. The system of claim 7, wherein the unresponsive storage system is determined to have failed based on a failure to connect to the unresponsive storage system within a predetermined failure time period.

9. The system of claim 7, wherein the implied value predetermined for the failed storage system comprises zero.

10. A method, comprising:
  requesting a first value and a second value each associated with an attribute of a cluster VM, wherein the cluster VM represents a state of a virtual machine distributively stored across a plurality of storage systems and a first portion of the cluster VM is stored at a first storage system included in the plurality of storage systems and a second portion of the cluster VM is stored at a second storage system included in the plurality of storage systems; and
  receiving the first value from the first storage system and the second value from the second storage system, wherein the first value is associated with the first portion of the cluster VM and the second value is associated with the second portion of the cluster VM;
  determining an attribute of the cluster VM using the first value from the first storage system and the second value from the second storage system according to an aggregation semantic, wherein the attribute includes an association with live data currently tracked by a hypervisor and an association with synthetic data not currently tracked by the hypervisor, the determination including:
    in response to a determination that there is at least one live value, discarding synthetic values, wherein a synthetic value represents a synthesized state of the cluster VM;
    in response to a determination that there are no live values, discarding those values older than the newest synthetic value;
    in response to a determination that the cluster VM attribute is static, determining a cluster VM attribute value by selecting one of the first value and the second value and
    in response to a determination that the cluster VM attribute is dynamic, determining the cluster VM attribute value by combining the first value and the second value.

11. The method of claim 10, wherein the cluster VM represents aggregated data associated with a VM across the plurality of storage systems.

12. The method of claim 10, further comprising:
  determining that a third value associated with the attribute associated with the cluster VM is not obtained from an unresponsive storage system of the plurality of storage systems; and
  determining an extrapolated value associated with the attribute associated with the cluster VM associated with the unresponsive storage system.

13. The method of claim 12, wherein the extrapolated value associated with the attribute associated with the cluster VM associated with the unresponsive storage system is determined based at least in part on a historical value associated with the attribute associated with the cluster VM that was previously obtained from the unresponsive storage system.

14. The method of claim 12, wherein the plurality of values is obtained from storage systems of the plurality of storage systems other than the unresponsive storage system and wherein aggregating the plurality of values associated with the attribute comprises determining a cluster value using the plurality of values and the extrapolated value.

15. The method of claim 14, further comprising:
  receiving a previously absent value associated with the attribute associated with the cluster VM from the unresponsive storage system; and
  in response to the receipt of the previously absent value associated with the attribute associated with the cluster VM from the unresponsive storage system:
    determining that the unresponsive storage system has become responsive; and
    updating the cluster value by removing the extrapolated value using the aggregation semantic associated with the attribute and adding the previously absent value using the aggregation semantic associated with the attribute.

16. The method of claim 14, further comprising:
  determining that the unresponsive storage system has failed; and
  in response to the determination that the unresponsive storage system has failed:

obtaining an implied value predetermined for a failed storage system; and updating the cluster value by removing the extrapolated value using the aggregation semantic associated with the attribute and adding the implied value using the aggregation semantic associated with the attribute.

17. A computer program product, the computer program product being embodied in a non-transitory computer readable storage medium and comprising computer instructions for:

requesting a first value and a second value each associated with an attribute of a cluster VM, wherein the cluster VM represents a state of a virtual machine distributively stored across a plurality of storage systems and a first portion of the cluster VM is stored at a first storage system included in the plurality of storage systems and a second portion of the cluster VM is stored at a second storage system included in the plurality of storage systems; and receiving the first value from the first storage system and the second value from the second storage system, wherein a first value is associated with the first portion of the cluster VM and the second value is associated with the second portion of the cluster VM;

determining an attribute of the cluster VM using the first value from the first storage system and the second value from the second storage system according to an aggregation semantic, wherein the attribute includes an association with live data currently tracked by a hypervisor and an association with synthetic data not currently tracked by the hypervisor, the determination including by:

in response to a determination that there is at least one live value, discarding synthetic values, wherein a synthetic value represents a synthesized state of the cluster VM;

in response to a determination that there are no live values, discarding those values older than the newest synthetic value;

in response to a determination that the cluster VM attribute is static, determining a cluster VM attribute value by selecting one of the first value and the second value; and in response to a determination that the cluster VM attribute is dynamic, determining the cluster VM attribute value by combining the first value and the second value.

18. The system of claim 1, wherein each of the plurality of storage systems is configured to store at least one of: snapshot data and replica data and the cluster VM attribute is associated with data at least one of the snapshot data and the replica data.

* * * * *

UNITED STATES PATENT AND TRADEMARK OFFICE
CERTIFICATE OF CORRECTION

PATENT NO. : 10,652,329 B1
APPLICATION NO. : 14/709341
DATED : May 12, 2020
INVENTOR(S) : Mark G. Gritter and Umesh Patil It is certified that error appears in the above-identified patent and that said Letters Patent is hereby corrected as shown below:

On the Title Page

In Column 2, item (56), U.S. patent documents, cite no. 2, delete "Simpson" and insert --SIMPSON et al.--, therefor.
In Column 2, item (56), U.S. patent documents, cite no. 4, delete "Iikura" and insert --LIKURA et al.--, therefor.
In Column 2, item (56), U.S. patent documents, cite no. 6, delete "Van Riel" and insert --VAN RIEL et al.--, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*